US012360732B2

(12) United States Patent
Mackay et al.

(10) Patent No.: US 12,360,732 B2
(45) Date of Patent: *Jul. 15, 2025

(54) SYNCHRONOUS SOUNDS FOR AUDIO ASSISTANT ON DEVICES

(71) Applicant: Google LLC, Mountain View, CA (US)

(72) Inventors: Kenneth Mackay, Mountain View, CA (US); Adrian Paul Diaconu, Mountain View, CA (US); Xiaowei Jiang, Mountain View, CA (US); Christopher K. Chan, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/417,785

(22) Filed: Jan. 19, 2024

(65) Prior Publication Data

US 2024/0152314 A1 May 9, 2024

Related U.S. Application Data

(63) Continuation of application No. 18/099,704, filed on Jan. 20, 2023, now Pat. No. 11,914,921, which is a continuation of application No. 17/280,849, filed as application No. PCT/US2019/054492 on Oct. 3, 2019, now Pat. No. 11,586,413.

(60) Provisional application No. 62/742,177, filed on Oct. 5, 2018.

(51) Int. Cl.
*G06F 3/16* (2006.01)
*H04L 7/00* (2006.01)
*H04L 65/61* (2022.01)

(52) U.S. Cl.
CPC ............ *G06F 3/165* (2013.01); *H04L 7/0012* (2013.01); *H04L 65/61* (2022.05)

(58) Field of Classification Search
None
See application file for complete search history.

(56) References Cited

U.S. PATENT DOCUMENTS

| | | | |
|---|---|---|---|
| 8,125,988 B1 * | 2/2012 | Sullivan | H04L 65/764 709/219 |
| 2015/0148927 A1 * | 5/2015 | Georges | G06F 3/165 700/94 |
| 2015/0256613 A1 * | 9/2015 | Walker | H04L 43/10 709/217 |

(Continued)

OTHER PUBLICATIONS

Carot et al., "GNSS-based Sound Card Synchronization", Sep. 1, 2019, IEEE, 2019 Federated Conference on Computer Science and Information Systems (FedCSIS) (2019, pp. 309-312) (Year: 2019).*

*Primary Examiner* — Davoud A Zand
(74) *Attorney, Agent, or Firm* — Kilpatrick Townsend & Stockton LLP

(57) ABSTRACT

The various implementations described herein include methods and systems for synchronous audio playback. An electronic device can receive an identification of a first device as a common clock device that has a first internal clock being designated as a master clock. The electronic device receives a synchronized audio playback command that includes audio data to be output and a future playback time. In response to receiving the audio data, the device determines a synchronized audio playback time for audio to be output. An optimal time for output can be calculated and transmitted to the server system for future playback time calculations.

20 Claims, 14 Drawing Sheets

(56) References Cited

U.S. PATENT DOCUMENTS

2015/0281752 A1\* 10/2015 Van Veldhuisen ... H04N 21/233
725/116

\* cited by examiner

SYNCHRONOUS SOUNDS FOR AUDIO ASSISTANT ON DEVICES

CROSS-REFERENCE TO RELATED APPLICATIONS

This application is a continuation of U.S. Non-Provisional application Ser. No. 18/099,704, filed Jan. 20, 2023, which is a continuation of U.S. Non-Provisional application Ser. No. 17/280,849, filed Mar. 26, 2021, which is the US national phase of International Patent Application No. PCT/US2019/054492, filed Oct. 3, 2019, which claims priority to U.S. Provisional Application No. 62/742,177, filed Oct. 5, 2018. The priority applications are hereby incorporated by reference in their entirety.

TECHNICAL FIELD

The disclosed implementations relate generally to voice interfaces and related devices, including but not limited to methods and systems for sound synchronization amongst multiple voice interface devices.

BACKGROUND

Multi-room audio systems are growing in popularity, and provide a convenient way to listen to audio anywhere in a home. Voice-activated wireless speaker systems and electronic devices are also becoming increasingly common. For example, many state-of-the-art mobile devices include a voice assistant feature (e.g., Siri™, Google Assistant™) that is configured to use voice inputs to initiate a phone call, conduct a restaurant search, start routing on a map, create calendar events, add a post to a social network, recognize a song, and complete many other tasks.

A location (e.g., a room or space within a home) may include multiple devices that include voice assistant systems. With the increase in multi-room voice activated devices, it is desirable to synchronize sounds played from multiple assistant devices in a home. For example, when multiple devices respond to a user query, text to speech responses from multiple speakers should sound synchronized. Similarly, it is desirable to synchronize audio broadcasts or other sound effects, such as doorbell ringing.

SUMMARY

Accordingly, there is a need for an electronic device with a voice assistant system and/or a voice assistant server system that incorporates methods and systems for multi-device sound synchronization. The device and/or the server system may be configured to play audio on multiple devices depending on the locations of the devices and use cases such that the audio sounds synchronized to a human listener.

In accordance with some implementations, a method is performed at each of a plurality of electronic devices, each electronic device including an audio system, an internal clock, one or more processors, and memory storing one or more programs for execution by the one or more processors. Each of the electronic devices is configured for two-way communications with a server and associated with a user account maintained at the server. In some implementations, each of the electronic devices is connected to a shared local area network. In some implementations, each of the electronic devices includes a network identifier; and the identification of the first one of the electronic devices as the common clock device is based at least in part on the network identifier. The method includes receiving from a server system an identification of a first one of the electronic devices as a common clock device. The first electronic device has a first internal clock being designated as a master clock which is known to the server system.

In some implementations, the method includes: downloading a device-agnostic sound assistant library configured to execute across the plurality of electronic devices, wherein the sound assistant library includes an audio synchronization module. The method further includes configuring the device-agnostic sound assistant library to execute on each electronic device. The operations of the method are performed by the audio synchronization module. In some implementations, the plurality of electronic devices includes a plurality of device types, and the device-agnostic sound assistant library is configured to execute on the plurality of device types.

The method includes receiving from the server system a synchronized audio playback command, the audio playback command including audio data to be output by each of the electronic devices and a future playback time relative to the master clock. In some implementations, the synchronized audio playback command is generated by the server system in response to a request for audio information. In some implementations, the request for audio information is received by a second one of the plurality of electronic devices. In some implementations, the future playback time is one of: a timestamp referenced to the master clock and a delay time referenced to the master clock. In some implementations, the audio playback command includes a command to play a sound that is stored on each of the plurality of electronic devices. In some implementations, the audio data comprises audio data identified by the server system.

In response to receiving the audio data, the method includes determining a synchronized audio playback time based on a time difference between the internal clock, the master clock, and the future playback time. In some implementations, the method includes converting the future playback time relative to the master clock to a timestamp relative to the internal clock. If the determined synchronized audio playback time has not yet occurred, the method includes outputting the audio data via the audio system based on the determined synchronized audio playback time. In some implementations, if the determined synchronized audio playback time has occurred, the method includes playing or declining to output the audio data via the audio system and reporting back to the server a first delay adjustment time required for the playback at the first electronic device to have been occurred at the future playback time.

In some implementations, the method includes: determining an optimal time at which the electronic device could have output the audio data, wherein the optimal time can be less than or greater than the future playback time; and sending information of the optimal time to the server system. In some implementations, the future playback time is based on the optimal time for each of the plurality of electronic devices.

In accordance with some implementations, an electronic device comprises one or more processors, and memory coupled to the one or more processors. The memory stores one or more programs configured to be executed by the one or more processors, the one or more programs including instructions for performing the method described above.

In accordance with some implementations, a non-transitory computer readable storage medium stores one or more programs. The one or more programs include instructions, which, when executed by an electronic device causes the electronic device to perform the method described above.

In accordance with some implementations, a method is performed at a server system that is communicatively connected to a plurality of electronic devices each comprising an audio system and an internal clock. The electronic devices include a first electronic device, and the plurality of electronic devices is associated with a user account. The server system comprises one or more processors and memory storing one or more programs for execution by the one or more processors. In some implementations, the plurality of electronic devices is connected to a common local area network. In some implementations, the server maintains a list of the electronic devices associated with the user account that are connected to the common local area network.

The method includes obtaining an identification of a common clock device from the plurality of electronic devices, the common clock device having an internal clock being designated as a master clock which is known to the server system. In some implementations, each of the electronic devices includes a network identifier, and selecting the common clock device is based at least in part on an ordering of the network identifiers for the subset of the electronic devices.

The method includes sending information of the selected common clock device to the plurality of electronic devices. The method includes receiving a notification from the first electronic device about an audio playback request. In some implementations, the audio playback request includes one or more of: a voice request, a hotword, and a notification from a device connected to the first electronic device.

In response to receiving the notification, the method includes: determining a subset of the plurality of electronic devices to execute the playback command, the subset including the common clock device; generating audio data corresponding to the playback request; and generating a synchronized audio playback command.

The method includes sending the synchronized audio playback command to the subset, the audio playback command including the audio data to be output by each of the electronic devices in the subset and a future playback time relative to the master clock. In some implementations, sending the synchronized audio playback command to the subset causes each of the electronic devices in the subset to: determine a synchronized audio playback time based on a time difference between the internal clock, the master clock, and the future playback time; if the determined synchronized audio playback time has not yet occurred, output the audio data via the audio system based on the determined synchronized audio playback time; and, if the determined synchronized audio playback time has occurred, play or decline to output the audio data via the audio system and report back to the server a first delay adjustment time required for the playback at the electronic device to have been occurred at the future playback time. In some implementations, if the determined synchronized audio playtime time has occurred, the subset of electronic devices may play (e.g., output) the audio data out of sync, or play (e.g., output) a fragment of the audio data in sync. In some implementations, determining a synchronized audio playback time includes determining an updated future playback time based on performance of the electronic devices in the subset using the determined synchronized audio playback time. In some implementations, the performance of the electronic devices in the subset includes one or more of a network packet latency, the audio data delay, an audio pipeline creation delay, and an audio pipeline delay. In some implementations, after sending the synchronized audio playback command, the method further includes determining from each of the electronic devices in the subset information of one or more of: a type/model of the electronic device, a playback length; success/failure of the synchronous audio playback; a failure mode; and an estimated optimal delay for the request.

In some implementations, the method includes, prior to sending a synchronized audio playback command to the subset, determining a future playback time. In some implementations, the future playback time is a predefined time.

In some implementations, the method includes: determining from each of the electronic devices in the subset an optimal time at which the electronic device could have output the audio data, wherein the optimal time is less than or greater than the future playback time; calculating an updated future playback time based on the optimal times for the subset; and including the updated future playback time in subsequent synchronized audio playback commands directed to the subset.

In accordance with some implementations, a computing system comprises one or more processors, and memory coupled to the one or more processors. The memory stores one or more programs configured to be executed by the one or more processors, the one or more programs including instructions for performing the method described above.

In accordance with some implementations, a non-transitory computer readable storage medium stores one or more programs. The one or more programs include instructions, which, when executed by a computing system causes the computing system to perform the method described above.

In accordance with some implementations, a device-agnostic audio assistant library is provided for electronic devices that include respective audio systems. The library comprises one or more audio processing modules configured to execute across a plurality of electronic devices, the plurality of electronic devices having a plurality of different electronic device types, the audio processing modules providing a plurality of audio processing operations; and one or more application programming interfaces (APIs) configured to provide interfaces between the plurality of audio processing operations and hardware and/or software of the electronic devices. The one or more audio processing modules and APIs include an audio synchronization module that enables synchronous sound playback of audio snippets on a first group of electronic devices on a common local network by audio-enabled applications configured to interact with one or more of the audio processing operations. In some implementations of the library, at least some audio processing operations associated with the voice processing modules are performed on a backend server interconnected with the electronic devices via a wide area network.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DESCRIPTION OF IMPLEMENTATIONS

Figure 1:
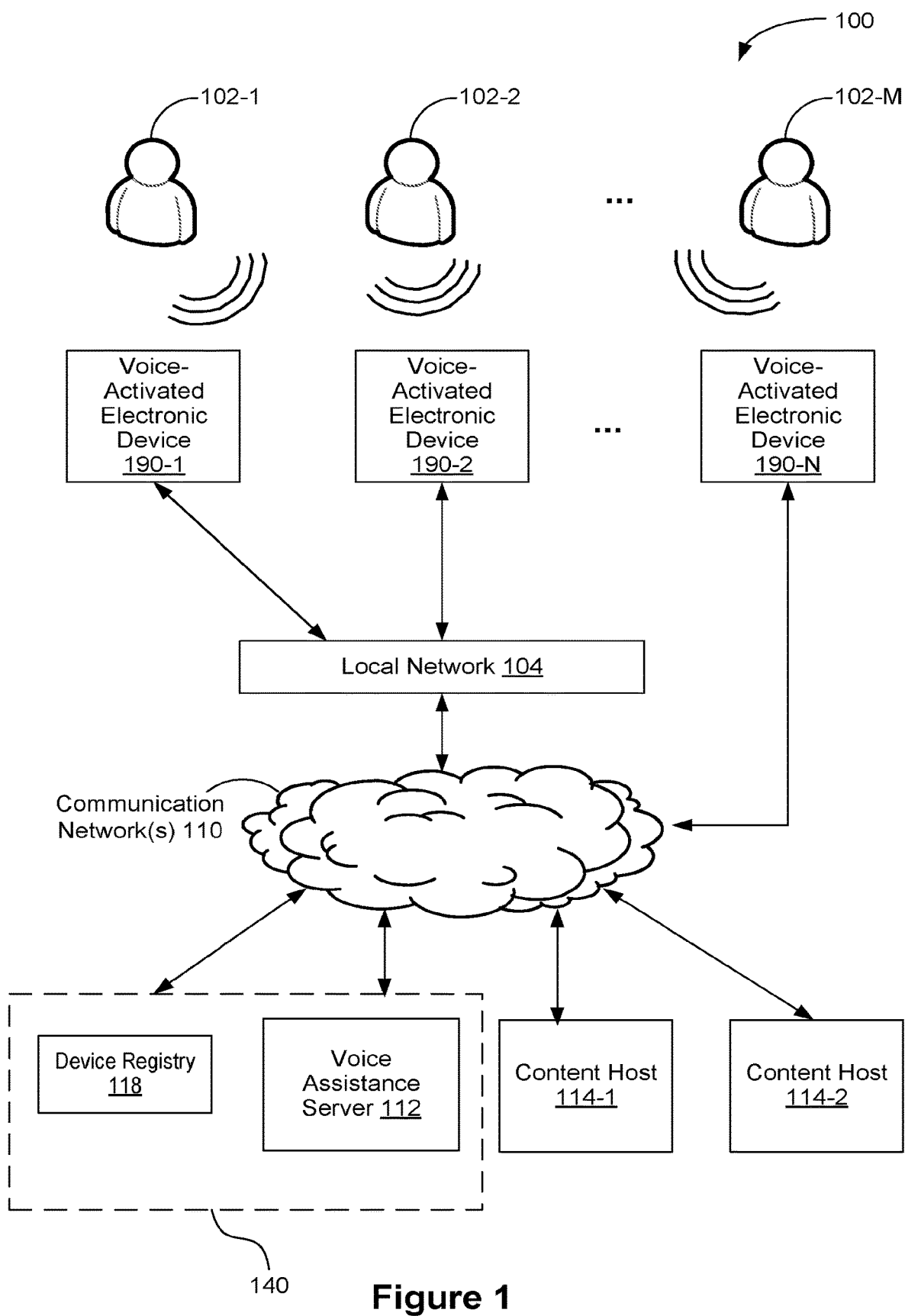
FIG. 1 is an example operating environment in accordance with some implementations.

In order for audio played by multiple voice-activated devices to sound "in sync" to a human listener, the audio should come out of the audio system of each device within a few milliseconds of each other. The exact timing requirements depend at least on the locations of the devices and the use case. For example, if each device is in a different room, a synchronization accuracy of 10 milliseconds could be sufficient, since audio propagation between rooms will typically be larger than that anyway. For devices in the same room, however, accuracy of 1 millisecond might be acceptable. For stereo/surround-sound playback, the synchronization should be within 1 sample (~20 microseconds) for best results. Apart from satisfying latency requirements, the disclosed implementations herein overcome various other challenges in multi-room sound synchronization and audio playback. For example, the set of devices that will play back the sound in sync may not be known beforehand, or the set of devices could vary depending on each individual query.

In accordance with some implementations, synchronous playback can be achieved by distributing audio to all the devices in a playback set, with timestamps relative to some common clock. Each device may then start playing the audio to match the common clock timestamps. In some implementations, matching the common clock timestamps includes defining the common clock. It includes distributing the audio data to all devices in the playback set. It also includes timestamping the audio. It further includes ensuring that each device plays out the audio at the correct time (corresponding to the timestamp). Audio playback can thus be monitored to be in sync (e.g., to be within 1 millisecond) across all devices in the playback set. Details of the steps are explained in more detail below.

Common Clock

In some implementations, the jitter for transmitting a packet (e.g., fluctuation in transmission latency) over a wireless network (e.g., Wi-Fi) can be higher than the desired sync accuracy. Therefore, signaling playback start by sending a signal from a given device (or from a server) may not provide accurate synchronization. Instead, each device can determine the offset between its internal clock and that of a common clock source (also known as a master clock). Each device can then apply this offset to output audio. Infrastructure similar to the one used for timing the arrival of keywords (for voice activation, sometimes called hotword detection) can be adapted for the purpose of audio synchronization.

Distributing Audio Data

In some implementations, synchronous sound playback can be triggered by events from a voice assistant server. In some instances, since there is no persistent predefined group of devices for synchronous sound playback, the server determines which devices to send the audio data to. There are at least two options for distributing audio to the set of devices: the server can send the audio data to each device over a previously-established channel, or the server can send the audio data to a single device along with the set of other devices that should play the audio. With the second option, the single device would then distribute the audio locally to other devices.

In the first scenario, the server could send the audio data to each device. In this model, the server has to send the data to each device in the playback set individually. The server could also send the IP host fragments of the other devices that should play the sound. This information could be used later for negotiating the start-of-playback timestamp (as further described below). If the server already has a connection to the receiving devices (e.g., as is the case with multi-device arbitration), then the server can simply output a text-to-speech (TTS) client operation (sometimes called a ClientOp) for each pipeline, with a new argument added for synchronous playing (see protocol description below). If, on the other hand, the server does not have a connection to all devices (e.g., for broadcast), then the server will send a notification (e.g., Google Cloud Messaging or GCM) message to all devices in the playback set. Upon receiving this notification, each device will contact the assistant server with a request (e.g., to play audio) seeking client input (sometimes called a ClientInput). At this point, the server can return the TTS ClientOp similar to when a connection is already established. Alternatively, when the latency exceeds a threshold, the information exchange between the server and the one or more client devices can be optimized by adding playback information to the initial notification (e.g., the GCM message), avoiding intermediate steps.

In the second scenario, the server can send audio data to a single device which then distributes the data to other devices. In this model, the server selects a 'leader' device, and sends the audio data only to the leader, along with the IP host fragments of the other devices that should play the audio. The leader then sends the audio data to each of the other devices. This distribution model requires less network bandwidth, since the audio data is only sent once. However, it requires almost twice as much Wi-Fi bandwidth, since there are two hops for each other device that the leader sends to (one hop to an access point and one to the target device) as opposed to one hop if the server sends the data directly to each device (since typically the access point has a wired connection to the network). This may lead to additional latency, depending on the effective throughput of the network connection relative to the Wi-Fi network. This distribution model can also be significantly more complicated due to the need for a protocol for sending data from the leader device to the other devices. One possibility is to use a User Datagram Protocol (UDP protocol) without retransmission; since the focus for synchronous sounds is to minimize latency, there is typically not enough time to retransmit packets anyways. In some instances, additional security issues arise with the audio distribution protocol. Since it is undesirable to allow anyone with access to the network (e.g., a LAN) to play audio out of any assistant devices on the network without authorization, some authentication of the data must be performed. This could be implemented via an agreement between the devices beforehand (e.g., to set up shared keys).

One solution to the issues associated with the distribution model as described above is to have the server distribute shared keys beforehand to all devices in the home. The server could then encrypt the audio data (e.g., using an Advanced Encryption Standard (AES)) using the shared key and a strictly increasing nonce, and send the data to the leader device. The leader device could simply resend the encrypted data to the other devices. This approach can be extended to the case when new devices are added that are not part of the same network. For example, a leader could be selected for each network (or sub-network), and data can be distributed in a hierarchical, or tree-like manner. This approach can thus be implemented with shared key distribution and rotation, encryption and authentication of audio data, and transport between the leader device and other devices. These additional complications make the redistribution approach less appealing. However, if the network bandwidth is an issue, this second approach could be chosen over the first approach where the server sends the audio data to each device because the resulting latency crosses a threshold. In some implementations, one of the two above scenarios is adopted. In other implementations, the server dynamically chooses between the two approaches based on network monitoring.

Timestamping Audio

In some implementations, in order for all devices in a playback set to play in sync, the audio can be timestamped relative to the common clock described above. A timestamp communicates to the device that the device should play the audio data at a common clock time. The timestamps could be generated by a server. In some implementations, it is challenging or impossible to measure one-way transmission delay over the Internet (sometimes called the network). Accordingly, the server overestimates the amount of delay to apply by at least (2 times round-trip time (RTT)), where RTT is the minimum round-trip time between the server and one of the devices in the playback set. This is because the server can only know the accuracy of the common clock of the target home to within 1 RTT, and also can only know the minimum transmission time to the set of playback devices to within 1 RTT.

Alternatively, each device estimates the timestamp to use for 'start of audio', and sends that timestamp to all other devices in the playback set. The lowest timestamp would win, for example. With this alternative, the wait time for all devices to respond (e.g., when one or more device is offline or is very slow) can be avoided. If a lower timestamp arrives after audio playback has started, the playback must be adjusted to match the lower timestamp so that all devices reach a consistent sync.

Determination of Timestamp

In some implementations, the timestamp for "start of audio" is the earliest possible time that would still allow all devices in the playback set to start playback on time. A number of factors can be taken into account in order to determine the playback start time for a device. Each device should receive some signal that synchronous playback is desired. This could be either the audio data from the server, or a "start playback timestamp" from some other device in the playback set. Each device should create and start an audio output pipeline once this signal is received. Time needed for creating the audio pipeline and issuing the first callback (e.g., a FillBuffer for filling a buffer) should be taken into account. The audio data should be available for the first callback. Once audio data has been passed to a callback routine (e.g., FillBuffer), there will be some delay before the audio is actually played out of the speaker.

Suppose that device A receives the audio data at time T (relative to the common clock). If device A sends a signal to all other devices in the playback set indicating that synchronous playback is desired, that signal can take some time (sometimes called the local packet latency) to arrive at each other device. This time delay will be different for different devices (and depends on Wi-Fi conditions). Once the maximum local packet latency is estimated, all devices can calculate (or be notified) to know that synchronous playback is desired at time (T+maximum local packet latency).

Devices could also receive the audio data from the server before the local packet arrives from device A. The audio data delay, e.g., the maximum time difference between the audio data arriving at the first device in the playback set (the first device that happens to receive the data) and the last device, can also be estimated. Then, all devices in the playback set can calculate (or be notified) to know that synchronous playback is required at time T+minimum (maximum local packet latency, audio data delay).

Once a device knows that playback is required, the device creates the audio pipeline. Each device can measure the time it takes between creating an audio pipeline and the first callback to fill buffer (e.g., FillBuffer( )). Calling this time measure the audio pipeline creation delay, all devices will get the first callback by T+minimum (maximum local packet latency, audio data delay)+maximum (audio pipeline creation delay). This quantity T+minimum (maximum local packet latency, audio data delay)+maximum (audio pipeline creation delay) is referred to as (T+FillBuffer delay).

When FillBuffer (or a similar callback for filling buffer) is called, a library (e.g., Google libassistant library) running on the device cannot actually push the audio data until the data arrives. Audio can start being pushed by all devices at time T+maximum (audio data delay, FillBuffer delay). Once the first audio data is pushed, that data will not be emitted out of the speakers immediately because of some audio pipeline delay. All devices can actually emit audio from the speakers at time T+maximum (audio data delay, FillBuffer delay)+maximum (audio pipeline delay).

When the server has estimated or calculated all of the relevant delays, the server can pre-calculate maximum (audio data delay, FillBuffer delay)+maximum (audio pipeline delay) for the playback set and send it down with the audio data as a single delay parameter. Then, when device A receives the audio data, it would calculate the playback timestamp (when the audio should actually come out of the speakers) as current time T (relative to common clock)+delay, and send it out to all other members of the playback set. The other devices in the playback set would do the same when they first receive the audio data.

Each device would then output audio to match the earliest known playback timestamp (adjusting as necessary if an earlier timestamp arrives after playback begins). Note that each device would convert this start-of-playback timestamp (which is relative to the common clock) to a timestamp relative to its own internal audio clock in order to correctly synchronize the audio playback.

In this server-estimated delay scenario, there are several characteristics that must be known (or estimated) in order to calculate the timestamp delay as described above. These include the local packet latency, audio data delay, audio pipeline creation delay (per device), and audio pipeline delay (per device). In some implementations, the characteristics may be estimated by the server by performing measurements. In some implementations and instances, the local packet latency and audio data delays could be measured by sending test data. The audio pipeline delays could be measured locally by each device. In some implementations, the measured data are stored on the server (with occasional recalibration) and are used to calculate the appropriate delay for a given set of devices for synchronous playback. This data can be passed to the server as part of a message (e.g., a ClientOpResult message) sent after TTS finishes playing, or as a new client input message to finish playing a TTS message (e.g., a ClientInput tts.FINISH_PLAY message).

To optimize time taken for the measurements and storing the values on the server, similar results can be obtained by measuring the overall delay during each synchronous sound playback, and storing a single delay value (e.g., per home) on the server. Suppose the server has a delay estimate for a given home. When synchronous sound playback is desired, the server sends the current delay estimate for that home along with the audio data; the devices in the playback set use that delay value to calculate the "start of playback" timestamp. Once synchronous sound playback is complete, each device in the playback set can determine what the optimal "start of playback" timestamp would have been (i.e., the earliest that playback could have started for smooth playback with no gaps due to missing audio). Each device will send the delta between the optimal start of playback and the actual start of playback. The delay estimate for the home can then be updated using the formula:

new delay=old delay+maximum (optimal deltas)

In some implementations, in order to reduce latency, the server can ignore outliers in the optimal delta value. For example, if one device in the playback set has a much larger audio pipeline delay than the other devices, its optimal delta will consistently be larger than the other devices in the home. The server could choose to ignore that optimal delta when updating the delay value. This may mean that some devices are unable to start playback in time with the other devices (due to not receiving the audio data yet, or the audio output pipeline having a long delay). This is acceptable since those devices can just join playback when ready. For many use cases, missing the first few dozen milliseconds of audio do not significantly affect user experience.

In some implementations and instances, the server has no delay information for any of the devices in the playback set, and thus it is possible that an estimate for the delay will be too short for any device to play out in time. Depending on the type of audio playback and the error handling method, this could result in no audio being played at all, which is clearly a bad user experience. To prevent this issue, the server can just not send any delay value at all. In this case, each device would just pick an appropriate delay that would ensure that it could play out on time. This would ensure that at least one device would be able to play. Each device will report its optimal delay to the server in the result message, and the server would then have a reasonable estimate for subsequent synchronous playback.

Audio Playback

In order to play audio in sync, each device determines when audio samples pushed to the output pipeline will actually be emitted from the speakers. An example code segment is shown below. This code could be integrated into a fill buffer module run on a device to include the output timestamp.

```
// |playback_time| is the time that the first sample filled into |buffer|
// will actually play out of the speaker. This time must be relative to the
// same clock used to timestamp audio input and reference data.
virtual void FillBuffer(AudioBuffer* buffer, int64_t playback_time,
        Callback1<int> done_cb) = 0;
```

Note that in order to minimize latency, the output pipeline delay, i.e., the difference between the time of the first call to fill buffer, e.g., call to FillBuffers( ) and the playback_time parameter passed to that FillBuffers( ) call, should be a small value (e.g., a value less than 50 milliseconds). This could be added as a requirement for embedders of the library (e.g., libassistant).

Once a device gets the signal that synchronous playback is about to start, the device could immediately create an audio output pipeline. Once the fill buffer routine (e.g., FillBuffer( )) is called, the library could fill silence (e.g., turn off audio) in small chunks (e.g., for 5 milliseconds) until the playback start timestamp is reached as shown by the following example code:

```
if (playback_time + 5ms < playback_start_time_)
    ... fill 5ms of silence ...
else if (playback_time < playback_start_time_)
    ... fill (playback_start_time_ - playback_time) of silence ...
else
    ... fill appropriate audio data, if available; else fill 5ms of silence.
```

The device code could fill small chunks of silence, so if the playback start time is updated (due to an earlier time arriving from another device), the start of playback is not significantly delayed.

The "in sync" timestamp for any given audio frame can be calculated as:

desired_play_time=playback_start_time_+FramesTo-Time(previous_frames)

In the above equation, previous_frames is the number of frames of audio that came before the frame in question (whether or not those frames were actually output). If the absolute value of the quantity (desired_play_time−playback_time) is greater than 1 millisecond, frames should be dropped (or silence filled) to get the audio back in sync. Otherwise, frames should just be pushed. When synchronous sounds are short, there is no need to resample the audio to exactly match the desired play times.

After dropping frames or adding silence, the library (e.g., libassistant library) that incorporates the ideas described here should fade in the audio to avoid pops/clicks. Ideally, the audio should also be faded out beforehand. This would require the library to keep a small buffer of audio in reserve to fade out in the case where the next audio buffer has not yet arrived from the server. When adjusting due to timestamp issues, the library can fade out by filling a few frames that match the previously filled audio, then make the necessary adjustment, and then fade in.

Error Handling

In some cases, some of the devices will not be able to start playback in time (i.e., at the playback start timestamp). For example, a device may not receive the audio data soon enough. There are at least the following three options to handle these situations. In the first option, the device could start playing the remaining audio in sync as soon as possible. If the device cannot start playing before some 'lateness threshold' after the playback start timestamp, the device can avoid playing the audio completely. Another option is that the device does not play the audio. This second option is a special case of the first option when the time out is zero. A third alternative is to start playing from the beginning when possible (out of sync). Depending on the use case for synchronous sound playback, any of these options may be appropriate. For example, for broadcast audio, it is probably better to start playing from the beginning (out of sync) when possible (option three described above). But for multi-device TTS responses, it is preferable to start playing in sync when possible (the first option). The message from the server containing the audio data could also contain the error handling strategy (e.g., "play in sync" with lateness threshold, or "play out of sync"). Each device will use that information to determine what to do if it is unable to start playback in sync. Note that the server may select a different strategy for each device, if desired.

Synchronous Execution of Other Activities

In addition to synchronizing sound playback, it may be desirable to synchronize other activities as well. The basic elements of the design described here will also work for any similar generic activity: (1) devices perform clock synchronization, so they are able to reference a common clock. The common clock infrastructure is generally applicable as long as the devices are on the same LAN (Local Area Network); (2) the server sends actions to all devices in the set, with a delay. Each device calculates the "start of action" timestamp (relative to the common clock) based on the delay, and sends out that timestamp to all other devices in the set; and (3) devices initiate the action at the earliest received timestamp. For cases where all devices are on the same LAN, the server could send: a universally unique identifier (UUID) identifying the synchronous action, the IP host fragments of the other devices in the set, and the delay value.

Additional fields from the server (such as error handling strategy) would depend on the specific action being synchronized. Also, the devices would need action-specific logic to start the desired action at the correct time (the equivalent of the FillBuffer+audio pipeline delay described for synchronous sounds).

Example Message Formats

Synchronous Playback Request

A request from the server to initiate synchronous playback could include the information suggested by the following code example:

```
message SynchronousPlaybackInfo {
  // UUID for this specific synchronous playback.
  optional string playback_uuid = 1;
  // IP host fragments of all devices in the synchronous playback set.
  repeated string ip_host_fragments = 2;
  // The delay in milliseconds to add to the current common clock timestamp to get
  // the playback start time,
  optional int32 delay_ms = 3;
  // What the device should do if it cannot start playback on time.
  enum LatePlaybackStrategy {
    PLAY_LATE_UNSPECIFIED = 0;
    // The device should start playing in sync whenever it can (dropping the first
    // portion of audio). If it cannot start playing until more than
    // <lateness_threshold_ms> after the playback start timestamp, it should not
    // play at all.
    PLAY_LATE_IN_SYNC = 1;
    // The device should play the entire audio clip (out of sync) as soon as it
    // can.
    PLAY_LATE_ENTIRE_AUDIO = 2;
  }
  optional LatePlaybackStrategy late_playback_strategy = 4;
  // The lateness threshold in milliseconds after which a device should not play
  // any audio at all (when using the PLAY_LATE_IN_SYNC strategy).
  optional int32 lateness_threshold_ms = 5;
}
```

Messages from the server to perform audio playback could add an optional SynchronousPlaybackInfo field or argument if synchronous playback should be supported. Devices will perform synchronous playback if SynchronousPlaybackInfo is present. For example, existing TTS (and broadcast messages) are sent as TTS client ops. The SynchronousPlaybackInfo field can be added as an additional argument of the tts.OUTPUT client operation.

Note that the start-of-playback timestamp should be calculated and distributed only once the client op action is actually executed. This allows multiple ops within a single response to be correctly synchronized across devices.

The server needs to know which devices support synchronous playback for TTS, and potentially synchronous execution of other ops in the future. Therefore, a field could be added to a SupportedClientOp message to indicate if the client supports synchronous execution of an operation as shown by the following example code:

```
message SupportedClientOp {
  optional string client_op_name = 1;
  <...>
  message Capabilities {
    optional bool supports_synchronous_execution = 1;
  }
  optional Capabilities capabilities = 4;
}
```

Start-of-Playback Timestamp

Once a device receives the SynchronousPlaybackInfo message (described above) for a given playback event, the device can calculate or estimate the start-of-playback timestamp based on the current common clock timestamp, and the value of delay_ms field in the SynchronousPlaybackInfo. The device will then send its start-of-playback timestamp out to all other devices in the playback set (using the IP host fragment info from the server to determine which devices to send to). This message will be sent unencrypted over UDP as shown by the following code example:

```
message StartOfSynchronousPlaybackTimestamp {
  // UUID of the synchronous playback event.
  optional string playback_uuid = 1;
  // Timestamp to start playback, relative to the common clock.
```

```
    optional fixed64 start_timestamp = 2;
}
```

Each device could use the minimum known value of the start-of-playback timestamp (received from other devices, and the value that it calculated) as the real timestamp to start playback from.

Result Message

Once a device has finished a synchronous sound playback, the device should send the result back to the server. This could be done via a voiceless request, for example, with a description of "synchronous_playback_result" and a payload (in Interaction.from_client.client_input) of a SynchronousPlaybackResult prototype as shown by the following example code:

```
message SynchronousPlaybackResult {
  // UUID of the synchronous playback event.
  optional string playback_uuid = 1;
  // The optimal value for the delay_ms field of Synchronous PlaybackInfo for
  // this device. This is the value of delay_ms that would have minimized the
  // playback latency while still allowing this device to start playback in sync.
  optional int32 optimal_delay_ms = 2;
  enum Outcome {
    OUTCOME_UNKNOWN = 0;
    // The device started playing the sound in s ync at the correct time.
    PLAYED_IN_SYNC = 1;
    // The device started playing later that the desired start-of-playback time.
    STARTED_PLAYBACK_LATE = 2;
    // The device did not play the sound at all.
    DID_NOT_PLAY = 3;
  }
  optional Outcome outcome = 3;
}
```

Looped Playback

In cases where playback is looped (for example, an alarm going off in a loop), one library implementation is to open a new output stream for each iteration of the loop. However, this will not work well without further modification with synchronous playback, since opening a new output stream will add some variable delay which will cause the devices to go out of sync. There are at least a few options to handle looped playback. One option is to add some metadata to the looped audio indicating the delay value to add to the start-of-playback timestamp for each iteration of the loop (similar to TTS with multiple clips). Devices will calculate a new start-of-playback timestamp for each loop iteration and start in sync. Another option is for devices to keep a single audio output stream and feed the looped data into the audio system repeatedly. This second option is conceptually simpler, but has a couple of disadvantages. First, if the looped output is played for a long time (several minutes) it could get out of sync due to media clock rate differences. Second, the looped audio file might need to have additional silence data added to it to get the desired playback frequency (e.g., how often the alarm tone is played). This would increase binary size on the device. In some implementations and instances, the first option is preferred.

Security and Privacy Considerations

In some implementations, messages between the server and devices could be encrypted for security. The UDP messages between devices (used to establish the start-of-playback timestamp) could be sent unencrypted over the local network, however, because those messages contain no sensitive information, and the impact of an attack is low. At worst, an attacker can cause TTS to play partially (or not at all, depending on the requested late playback strategy). In some implementations, the server should know the IP host fragment of each device in the playback set, so that devices may communicate the desired start-of-playback timestamp between each other. This information could be gathered while establishing a common clock.

Metrics and Logging

For each synchronous playback request, each client device and/or the server could log an event (for each client device) containing the following information: the device type/model (e.g., Google Home™, Google Home Mini™), the playback length, the requested delay, the success/failure of synchronous playback, the failure mode (didn't play/played late) in the event of a failure, and the estimated optimal delay for the request. A client op used for TTS could be used for logging with some extra arguments or parameters. So the logging could be affected by a framework that collects metrics on how many times the extra arguments or parameters are sent to a client device. After playing audio, the device could send back to the server a message (e.g., ClientOpResult) which will supply the server with success metrics.

Voice Assistant Operating Environment

FIG. 1 is an example operating environment in accordance with some implementations. Operating environment 100 includes one or more voice-activated electronic devices 190 (e.g., electronic devices 190-1 thru 190-N). The one or more voice-activated electronic devices 190 may be located in one or more locations (e.g., all in a room or space of a structure, spread out throughout multiple spaces within a structure or throughout multiple structures (e.g., one in a house and one in another house). The environment 100 optionally includes one or more devices (e.g., media devices, smart home devices) (not shown) with which the voice-activated electronic devices 190 can communicate.

The electronic devices 190 are communicatively coupled, through communication networks 110, to a voice assistance server 112 of a voice assistant service. One or more of the electronic devices 190 are communicatively coupled to a local network 104, which is communicatively coupled to the communication networks 110 (e.g., electronic devices 190-1 and 190-2). In some implementations, the local network 104 is a local area network implemented at a network interface (e.g., a router). The electronic devices 190 that are communicatively coupled to the local network 104 may also communicate with each other through the local network 104.

Optionally, one or more of the electronic devices 190 are communicatively coupled to the communication networks 110 and are not on the local network 104 (e.g., electronic device 190-N). For example, these electronic devices 190 are not on the Wi-Fi network corresponding to the local network 104 but are connected to the communication networks 110 through a cellular connection. In some implementations, communication between electronic devices 190 that are on the local network 104 and electronic devices 190 that are not on the local network 104 are done through the voice assistance server 112. The electronic devices 190 are registered in a device registry 118 of the voice assistant service and thus known to the voice assistance server 112. In some implementations, the device registry 118 and the voice assistant server 112 are part of a server system 140.

The environment 100 also includes one or more content hosts 114. A content host 114 may be a remote content source from which content is streamed or otherwise obtained in accordance with a user voice request. A content host 114 may be an information source from which the voice assistance server 112 retrieves information in accordance with a user voice request.

In some implementations, an electronic device 190 may be associated with multiple users having respective user accounts in the user domain. Any of these users, as well as users not associated with the device, may make voice inputs to the electronic device 190. The electronic device 190 receives these voice inputs from these users 102-1 thru 102-M (including associated and non-associated users), and the electronic device 190 and/or the voice assistance server 112 proceeds to identify, for a voice input, the user making the voice input. With the user identification, a response to that voice input may be personalized to the identified user.

In some implementations, the environment 100 includes multiple electronic devices 190 (e.g., devices 190-1 thru 190-N). The devices 190 are located throughout the environment 100 (e.g., all within a room or space in a structure, spread throughout the structure, some within the structure and some without). When a user 102 makes a voice input, each of the devices 190 either receives the input or does not receive the input (e.g., if the device was too far away from the user). The devices that receive the input receive the input at varying degrees of quality; the quality of the sample of the voice input at a device is based on multiple factors, including but not limited to distance of the user from the device and the noise around the device. In some implementations, the multiple devices 190 negotiate a leader amongst themselves to respond to the user and to receive further voice input from the user 102 based on the quality of the samples of the voice inputs.

In some implementations, an electronic device 190 determines a level of noise around the device and determines whether the determined noise level is sufficiently high to interfere with recognition of the hotword in voice inputs, and thus interfere with awakening of the device by voice, or with recognition of voice requests. If the noise level is determined to be sufficiently high to be interfering, the electronic device 190 indicates to the user that the noise level is interfering and gives the user a hint that the user should use another way to wake up the electronic device 190 (e.g., activate a button). The indication of the interfering noise level and the hint to use another way to wake up the device may be done in the same presentation (e.g., illuminating the wake-up button).

In some implementations, one or more media devices are disposed in the operating environment 100 to provide to one or more occupants media content, news and/or other information. In some implementations, the content provided by the media devices is stored at a local content source, streamed from a remote content source (e.g., content host(s) 114), or generated locally (e.g., through a local text to voice processor that reads a customized news briefing, emails, texts, a local weather report, etc. to one or more occupants of the operating environment 100). In some implementations, the media devices include media output devices that directly output the media content to an audience (e.g., one or more users), and cast devices that are networked to stream media content to the media output devices. Examples of the media output devices include, but are not limited to television (TV) display devices and music players. Examples of the cast devices include, but are not limited to, set-top boxes (STBs), DVD players, TV boxes, and media streaming devices, such as Google's Chromecast™ media streaming device.

In some implementations, the media devices include one or more voice-activated electronic devices 190 that receive, process and respond to voice commands of occupants. In some implementations, the voice-activated electronic devices 190 respond to voice commands by: generating and providing a spoken response to a voice command (e.g., speaking the current time in response to the question, "what time is it?"); streaming media content requested by a user (e.g., "play a Beach Boys song"); reading a news story or a daily news briefing prepared for the user; playing a media item stored on the personal assistant device or on the local network; changing a state or operating one or more other connected devices within the operating environment 100 (e.g., turning lights, appliances or media devices on/off, locking/unlocking a lock, opening windows, etc.); or issuing a corresponding request to a server via a network 110.

In some implementations, the one or more electronic devices 190 are disposed in the operating environment 100 to collect audio inputs for initiating various functions, including media play functions of the media devices. In some implementations, these voice-activated electronic devices 190 (e.g., devices 190-1 thru 190-N) are disposed in proximity to a media device, for example, in the same room with the cast devices and the media output devices. Alternatively, in some implementations, a voice-activated electronic device 190 is disposed in a room having one or more smart home devices but not any media device. Alternatively, in some implementations, a voice-activated electronic device 190 is disposed in a location having no networked electronic device. Further, in some implementations, a room or space in the structure may have multiple electronic devices 190.

In some implementations, the electronic device 190 includes at least one or more microphones, a speaker, a processor and memory storing at least one program for execution by the processor. The speaker is configured to allow the electronic device 190 to deliver voice messages and other audio (e.g., audible tones) to a location where the electronic device 190 is located in the operating environment 100, thereby broadcasting music, reporting a state of audio input processing, having a conversation with or giving instructions to a user of the electronic device 190. As an alternative to the voice messages, visual signals could also be used to provide feedback to the user of the electronic device 190 concerning the state of audio input processing.

When the electronic device 190 is a mobile device (e.g., a mobile phone or a tablet computer), its display screen is configured to display a notification concerning the state of audio input processing.

In some implementations, the electronic device 190 is a voice interface device that is network-connected to provide voice recognition functions with the aid of a voice assistance server 112 and/or optionally a cloud cast service server (not shown). For example, the electronic device 190 includes a smart speaker that provides music to a user and allows eyes-free and hands-free access to a voice assistant service (e.g., Google Assistant). Optionally, the electronic device 190 is one of a desktop or laptop computer, a tablet, a mobile phone that includes a microphone, a cast device that includes a microphone and optionally a speaker, an audio system (e.g., a stereo system, a speaker system, a portable speaker) that includes a microphone and a speaker, a television that includes a microphone and a speaker, and a user interface system in an automobile that includes a microphone and a speaker and optionally a display. Optionally, the electronic device 190 is a simple and low cost voice interface device. Generally, the electronic device 190 may be any device that is capable of network connection and that includes a microphone, a speaker, and programs, modules, and data for interacting with voice assistant service. Given simplicity and low cost of the electronic device 190, the electronic device 190 includes an array of light emitting diodes (LEDs) rather than a full display screen, and displays a visual pattern on the LEDs to indicate the state of audio input processing. In some implementations, the LEDs are full color LEDs, and the colors of the LEDs may be employed as a part of the visual pattern to be displayed on the LEDs. Multiple examples of using LEDs to display visual patterns in order to convey information or device status are described in U.S. Provisional Patent Application No. 62/336,566, entitled "LED Design Language for Visual Affordance of Voice User Interfaces," filed May 13, 2016, which is incorporated by reference in its entirety. In some implementations, visual patterns indicating the state of voice processing operations are displayed using characteristic images shown on conventional displays associated with electronic devices that are performing the voice processing operations.

In some implementations, LEDs or other visual displays are used to convey a collective voice processing state of multiple participating electronic devices. For example, in an operating environment where there are multiple voice processing or voice interface devices (e.g., multiple electronic devices 400 as shown in FIG. 4 of the '566 application, duplicated as FIG. 8A below; multiple electronic devices 190), groups of color LEDs (e.g., LEDs 404 as shown in FIG. 4 of the '566 application) associated with respective electronic devices can be used to convey which of the electronic devices is listening to a user, and which of the listening devices is the leader (where the "leader" device generally takes the lead in responding to a spoken request issued by the user).

More generally, the '566 application describes (e.g., see paras. [0087]-[0100]) a "LED Design Language" for indicating visually using a collection of LEDs a variety of voice processing states of an electronic device, such as a "Hot word detection state and listening state," a "Thinking mode or working mode," and a "Responding mode or speaking mode." In some implementations, unique states of voice processing operations described herein are represented using a group of LEDs in accordance with one or more aspects of the "LED Design Language" of the '566 application. These visual indicators can also be combined with one or more audible indicators generated by electronic devices that are performing voice processing operations. The resulting audio and/or visual indicators will enable users in a voice-interactive environment to understand the state of various voice processing electronic devices in the environment and to effectively interact with those devices in a natural, intuitive manner.

When voice inputs from the electronic device 190 are used to control the media output devices via the cast devices, the electronic device 190 effectively enables a new level of control of cast-enabled media devices. In a specific example, the electronic device 190 includes a casual enjoyment speaker with far-field voice access and functions as a voice interface device for the voice assistant service. The electronic device 190 could be disposed in any area in the operating environment 100. When multiple electronic devices 190 are distributed in multiple rooms, they become cast audio receivers that are synchronized to provide voice inputs from all these rooms.

Specifically, in some implementations, the electronic device 190 includes a Wi-Fi speaker with a microphone that is connected to a voice-activated voice assistant service (e.g., Google Assistant). A user can issue a media play request via the microphone of electronic device 190, and ask the voice assistant service to play media content on the electronic device 190 itself or on another connected media output device. For example, the user can issue a media play request by saying to the Wi-Fi speaker "OK Google, play cat videos on my Living room TV." The voice assistant service then fulfils the media play request by playing the requested media content on the requested device using a default or designated media application.

In some implementations, a user can issue a voice request, via the microphone of the electronic device 190, concerning media content that has already been played or is being played on a display device (e.g., the user can ask for information about the media content, buy the media content through an online store, or compose and issue a social post about the media content).

In some implementations, a user may want to take a current media session with them as they move through the house and can request such a service from one or more of the electronic devices 190. This requires the voice assistant service to transfer the current media session from a first cast device to a second cast device that is not directly connected to the first cast device or has no knowledge of the existence of the first cast device. Subsequent to the media content transfer, a second output device coupled to the second cast device continues to play the media content previously a first output device coupled to the first cast device from the exact point within a music track or a video clip where play of the media content was forgone on the first output device. In some implementations, the electronic device 190 that receives the request to transfer the media session can satisfy the request. In some implementations, the electronic device 190 that receives the request to transfer the media session relays the request to another device or system (e.g., a hub device, voice assistance server 112) for handling.

Further, in some implementations, a user may issue, via the microphone of electronic device 190, a request for information or for performance of an action or operation. The information requested may be personal (e.g., the user's emails, the user's calendar events, the user's flight information, etc.), non-personal (e.g., sports scores, news stories, etc.) or somewhere in between (e.g., scores for teams or sports preferred by the user, news stories from the user's preferred sources, etc.). The requested information or action/ operation may involve access to personal information (e.g., purchasing a digital media item with payment information provided by the user, purchasing a physical good). The electronic device 190 responds to the request with voice message responses to the user, where the response may include, for example, requests for additional information to fulfill the request, confirmation that the request has been fulfilled, notice that the request cannot be fulfilled, and so forth.

In some implementations, in addition to the voice-activated electronic devices 190 and the media devices (e.g., the output devices and the cast devices), the operating environment 100 may also include one or more smart home devices (not shown). The integrated smart home devices include intelligent, multi-sensing, network-connected devices that integrate seamlessly with each other in a smart home network and/or with a central server or a cloud-computing system to provide a variety of useful smart home functions. In some implementations, a smart home device is disposed at the same location of the operating environment 100 as a cast device and/or an output device, and therefore, is located in proximity to or with a known distance with respect to the cast device and the output device.

The smart home devices in the operating environment 100 may include, but are not limited to, one or more intelligent, multi-sensing, network-connected thermostats, one or more intelligent, network-connected, multi-sensing hazard detectors, one or more intelligent, multi-sensing, network-connected entryway interface devices and (hereinafter referred to as "smart doorbells" and "smart door locks"), one or more intelligent, multi-sensing, network-connected alarm systems, one or more intelligent, multi-sensing, network-connected camera systems, and one or more intelligent, multi-sensing, network-connected wall switches, and one or more intelligent, multi-sensing, network-connected power sockets. In some implementations, the smart home devices in the operating environment 100 of FIG. 1 includes a plurality of intelligent, multi-sensing, network-connected appliances (hereinafter referred to as "smart appliances"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, any one of these smart home device types can be outfitted with microphones and one or more voice processing capabilities as described herein so as to in whole or in part respond to voice requests from an occupant or user.

In some implementations, each of the cast devices and the voice-activated electronic devices 190 is capable of data communications and information sharing with other cast devices, voice-activated electronic devices 190, smart home devices, a central server or cloud-computing system, and/or other devices (e.g., the client device) that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Through the communication networks (e.g., the Internet) 110, the cast devices, the electronic devices 190 and the smart home devices may communicate with a server system (also called a central server system and/or a cloud-computing system herein). Optionally, the server system may be associated with a manufacturer, support entity, or service provider associated with the cast devices and the media content displayed to the user. Accordingly, the server system includes the voice assistance server 112 that processes audio inputs collected by voice-activated electronic devices 190, one or more content hosts 114 that provide the displayed media content, a cloud cast service server creating a virtual user domain based on distributed device terminals, and the device registry 118 that keeps a record of the distributed device terminals in the virtual user environment. Examples of the distributed device terminals include, but are not limited to the cast devices, the media output devices, the electronic devices 190 and the smart home devices. In some implementations, these distributed device terminals are linked to a user account (e.g., a Google user account) in the virtual user domain. It should be appreciated that processing of audio inputs collected by electronic devices 190 can be performed locally at an electronic device 190, at a voice assistance server 112, at another smart home device (e.g., a hub device) or at some combination of all or subset of the above.

It will be appreciated that in some implementations the electronic device(s) 190 also function in an environment without smart home devices. For example, an electronic device 190 can, even in the absence of smart home devices, respond to user requests for information or performance of an action, and/or to initiate or control various media play functions. An electronic device 190 can also function in a wide range of environments, including, without limitation, a vehicle, a ship, a business, or a manufacturing environment.

In some implementations, an electronic device 190 is "awakened" (e.g., to activate an interface for the voice assistant service on the electronic device 190, to put the electronic device 190 into a state where the electronic device 190 is ready to receive voice requests to the voice assistant service) by a voice input that includes a hotword (also called a "wake word"). In some implementations, the electronic device 190 requires awakening if the electronic device 190 has been idle with respect to receipt of voice inputs for at least a predefined amount of time (e.g., 5 minutes); the predefined amount of time corresponds to an amount of idle time allowed before a voice interface session or conversation times out. The hotword may be a word or phrase, and may be a predefined default and/or may be customized by a user (e.g., a user may set a nickname for a particular electronic device 190 as the device's hotword). In some implementations, there may be multiple hotwords that can awaken an electronic device 190. A user may speak the hotword, wait for an acknowledgement response from the electronic device 190 (e.g., the electronic device 190 outputs a greeting), and them make a first voice request. Alternatively, the user may combine the hotword and the first voice request in one voice input (e.g., the voice input includes the hotword followed by the voice request).

In some implementations, the voice inputs spoken by the user to an electronic device 190 may generally be freeform or natural language speech. That is, the voice input need not be strictly limited to a predefined set of words and phrases within a predefined syntax, with possibly certain exceptions (e.g., user needs to speak the hotword first to awaken the device).

In some implementations, an electronic device 190 includes one or more additional ways or affordances to wake up the device besides speaking the hotword to the electronic device 190. The additional ways or affordances may include, for example, activating a predefined button or touch sensor (e.g., a touch sense array) on the electronic device 190.

In some implementations, a voice-activated electronic device 190 interacts with a cast device, a client device or a server system of an operating environment 100 in accordance with some implementations. The voice-activated electronic device 190 is configured to receive audio inputs from an environment in proximity to the voice-activated electronic device 190. Optionally, the electronic device 190 stores the audio inputs and at least partially processes the audio inputs locally. Optionally, the electronic device 190 transmits the received audio inputs or the partially processed audio inputs to a voice assistance server 112 via the communication networks 110 for further processing. The cast device is configured to obtain media content or Internet content from one or more content hosts 114 for display on an output device coupled to the cast device. In some implementations, the cast device and the voice-activated electronic device 190 are linked to each other in a user domain, and more specifically, associated with each other via a user account in the user domain Information of the cast device and information of the electronic device 190 are stored in the device registry 118 in association with the user account. In some implementations, there is a device registry for cast devices and a registry for voice-activated electronic devices 190. In some implementations, a cloud cast service server manages the cast devices registry and the voice assistance server 112 manages the voice-activated electronic devices registry. The cast devices registry may reference devices in the voice-activated electronic devices registry that are associated in the user domain, and vice versa.

In some implementations, one or more of the electronic devices 190 (and one or more cast devices) are commissioned to the voice assistant service via a client device (not shown). In some implementations, the voice-activated electronic device 190 does not include any display screen, and relies on the client device to provide a user interface during a commissioning process, and similarly for a cast device as well. Specifically, the client device is installed with an application that enables a user interface to facilitate commissioning of a new voice-activated electronic device 190 disposed in proximity to the client device. A user may send a request on the user interface of the client device to initiate a commissioning process for the new electronic device 190 that needs to be commissioned. After receiving the commissioning request, the client device establishes a short range communication link with the new electronic device 190 that needs to be commissioned. Optionally, the short range communication link is established based near field communication (NFC), Bluetooth, Bluetooth Low Energy (BLE) and the like. The client device then conveys wireless configuration data associated with a wireless local area network (WLAN) (e.g., local network 104) to the new or electronic device 190. The wireless configuration data includes at least a WLAN security code (i.e., service set identifier (SSID) password), and optionally includes a SSID, an Internet protocol (IP) address, proxy configuration and gateway configuration. After receiving the wireless configuration data via the short range communication link, the new electronic device 190 decodes and recovers the wireless configuration data, and joins the WLAN based on the wireless configuration data.

In some implementations, additional user domain information is entered on the user interface displayed on the client device, and used to link the new electronic device 190 to an account in a user domain. Optionally, the additional user domain information is conveyed to the new electronic device 190 in conjunction with the wireless communication data via the short range communication link. Optionally, the additional user domain information is conveyed to the new electronic device 190 via the WLAN after the new device has joined the WLAN.

Once the electronic device 190 has been commissioned into the user domain, other devices and their associated activities may be controlled via multiple control paths. In accordance with one control path, an application installed on the client device is used to control the other device and its associated activities (e.g., media play activities). Alternatively, in accordance with another control path, the electronic device 190 is used to enable eyes-free and hands-free control of the other device and its associated activities.

Voice Activated Media Play on a Media Output Device

In some implementations, after the cast device and the voice-activated electronic device 190 are both commissioned and linked to a common user domain, the voice-activated electronic device 190 can be used as a voice user interface to enable eyes-free and hands-free control of media content streaming to the cast device involving no remote control, client device or other second screen device. For example, the user may give voice commands such as "Play Lady Gaga on Living Room speakers." A Lady Gaga music track or video clip is streamed to a cast device associated with the "Living Room speakers." The client device is not involved, nor is any cast device application or media play application loaded on the client device.

In some implementations, a proxy service (e.g., voice assistant service, a cloud cast service) communicatively links the voice-activated electronic device 190 to the cast device and makes casting to the cast device possible without involving any applications on the client device. Specifically, a voice message is captured and recorded by an electronic device 190, and the voice message is configured to request media play on a media output device. Optionally, the electronic device 190 partially processes the voice message locally. Optionally, the electronic device 190 transmits the voice message or the partially processed voice message to a voice assistance server 112 via the communication networks 110 for further processing. The voice assistance server 112 or a cloud cast service server determines that the voice message includes a first media play request, and that the first media play request includes a user voice command to play media content on a media output device and a user voice designation of the media output device. The user voice command further includes at least information of a first media play application (e.g., YouTube and Netflix) and the media content (e.g., Lady Gaga music) that needs to be played.

In accordance with the voice designation of the media output device, the voice assistance server 112 or the cloud cast service server identifies in a device registry 118 a cast device associated in the user domain with the electronic device 190 and coupled to the media output device. The cast device is configured to execute one or more media play applications for controlling the media output device to play media content received from one or more media content hosts 114. Then, the cloud cast service server sends to the cast device a second media play request including the information of the first media play application and the media content that needs to be played. Upon receiving the information sent by the cloud cast service server, the cast device executes the first media play application and controls the media output device to play the requested media content.

In some implementations, the user voice designation of the media output device includes a description of the destination media output device. The voice assistance server 112 or the cloud cast service server identifies in the device registry 118 the destination media output device among a plurality of media output devices according to the description of the destination media output device. In some implementations, the description of the destination media output device includes at least a brand ("Samsung TV") or a location of the media output device ("my Living Room TV").

Voice Activated Media Transfer Among Media Output Devices

In some implementations, the operating environment 100 includes a first cast device (not shown) and a first output device (not shown) coupled to the first cast device. The operating environment 100 also includes a second cast device (not shown) and a second output device (not shown) coupled to the second cast device. The cast devices are optionally located in the same location (e.g., the living room) or two distinct locations (e.g., two rooms) in the operating environment 100. Each of the cast devices is configured to obtain media content or Internet content from content hosts 114 for display on the output device coupled to the respective cast device. Both the first and second cast devices are communicatively coupled to the voice assistance server 112, optionally a cloud cast service server, and the content hosts 114.

The operating environment 100 further includes one or more voice-activated electronic devices 190 that are communicatively coupled to the voice assistance server 112 and optionally the cloud cast service server. In some implementations, the voice-activated electronic devices 190 are disposed independently of the cast devices and the output devices. For example, an electronic device 190 is disposed in a room where no cast device or output device is located. In some implementations, a first electronic device 190 is disposed in proximity to the first cast device and the first output device, e.g., the first electronic device 190, the first cast device and the first output device are located in the same room. Optionally, a second electronic device 190 is disposed independently of or in proximity to the second cast device and the second output device.

When media content is being played on the first output device, a user may send a voice command to any of the electronic devices 190 to request play of the media content to be transferred to the second output device. The voice command includes a media play transfer request. In one situation, the user can issue the voice command to the electronic device 190 disposed in proximity to the first cast device before the user moves to a destination location. Alternatively, in another situation, the user can issue the voice command to the electronic device 190 disposed in proximity to the second device after the user reaches the destination location.

The voice command is transmitted to the voice assistance server 112. The voice assistance server 112 sends a media display information request to the first cast device to request instant media play information of the media content that is currently being played on the first output device coupled to the first cast device. The first cast device then returns to the voice assistance server 112 the requested instant play information including at least information of a first media play application (e.g., YouTube), the media content that is currently being played (e.g., "Lady Gaga—National Anthem—Super Bowl 2016"), and a temporal position related to playing of the media content. The second cast device then receives a media display request including the instant play information from the voice assistance server 112, and in accordance with the instant play information, executes the first media play application that controls the second output device to play the media content from the temporal location.

For example, when a music playlist is played on the first output device, the user says "Play on my living room speakers." The first output device stops playing the currently played song, and the stopped song resumes on the living room speakers. When the song is completed, the living room speakers continue to play the next song on the music playlist previously played on the first output device. As such, when the user is moving around in the operating environment 100, the play of the media content would seamlessly follow the user while only involving limited user intervention (i.e., giving the voice command).

Individual Devices Involved in the Operating Environment

Figure 2A:
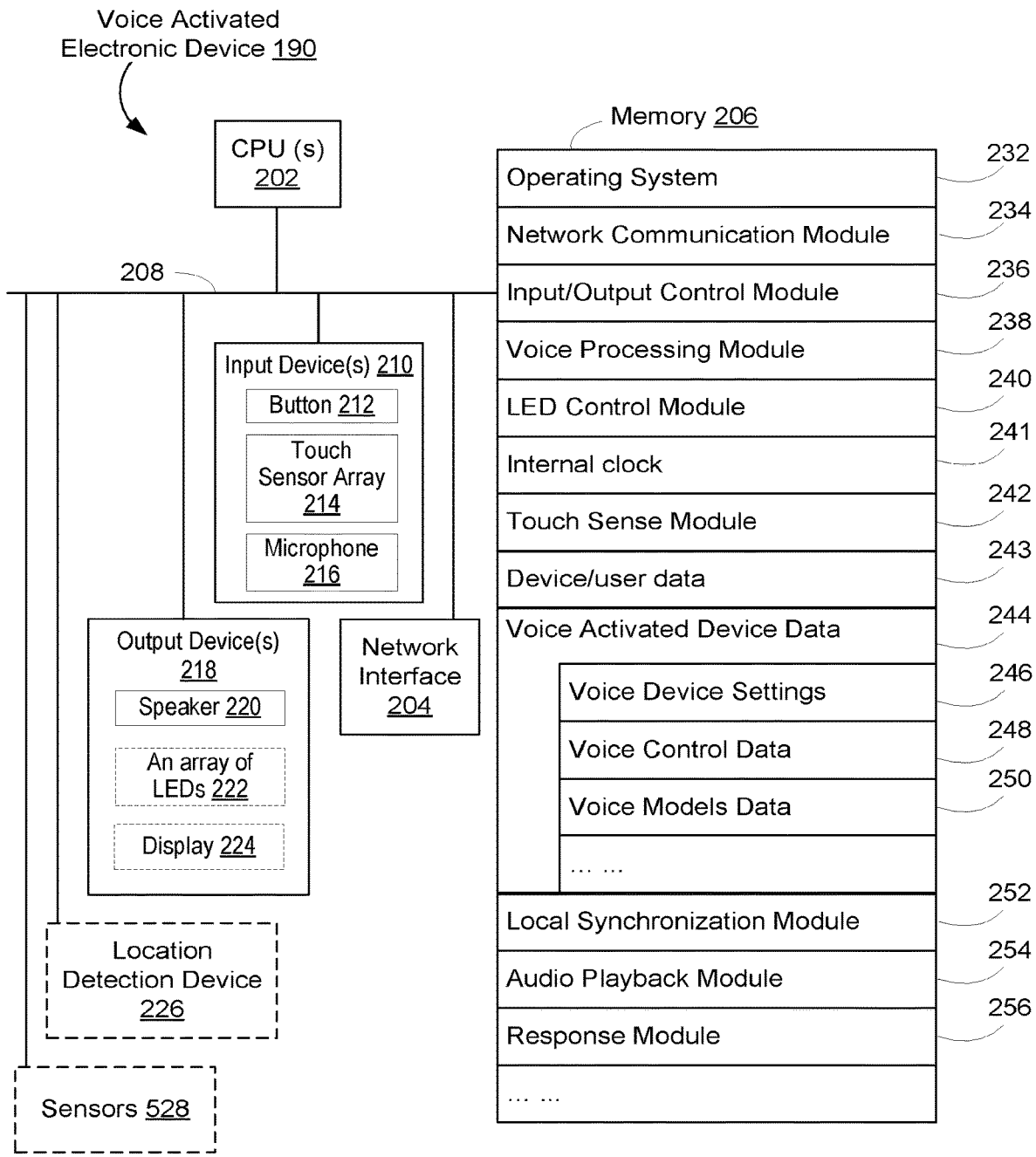
FIGS. 2A-2C are block diagrams illustrating an example electronic device with audio synchronization in an operating environment in accordance with some implementations.
Figure 2B:
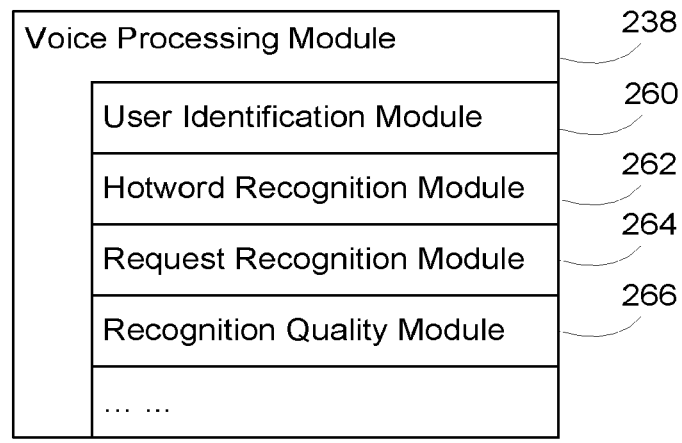
Figure 2C:
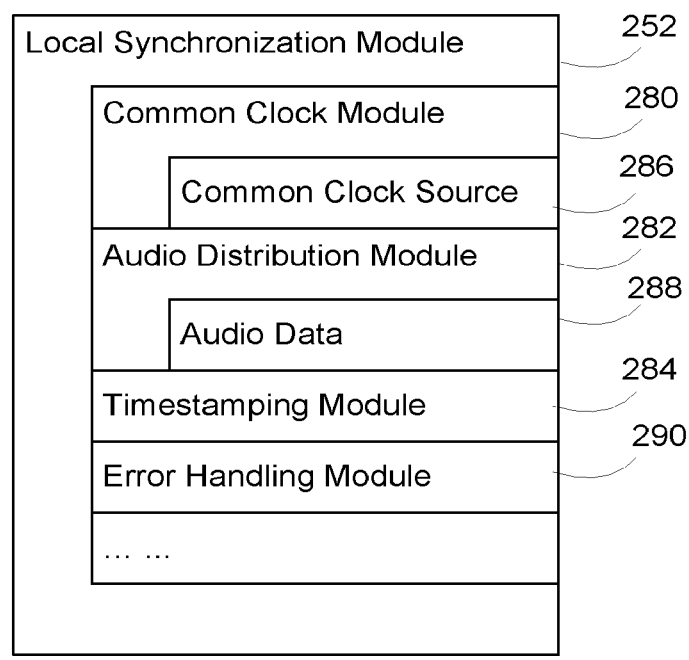

FIGS. 2A-2C are block diagrams illustrating an example electronic device 190 with audio synchronization in an operating environment (e.g., operating environment 100) in accordance with some implementations. The electronic device 190, typically, includes one or more processing units (CPUs) 202, one or more network interfaces 204, memory 206, and one or more communication buses 208 for interconnecting these components (sometimes called a chipset). The electronic device 190 includes one or more input devices 210 that facilitate user input, such as a button 212, a touch sense array 214, and one or more microphones 216. The electronic device 190 also includes one or more output devices 218, including one or more speakers 220, optionally an array of LEDs 222, and optionally a display 224. In some implementations, the array of LEDs 222 is an array of full color LEDs. In some implementations, an electronic device 190, depending on the type of device, has either the array of LEDs 222, or the display 224, or both. In some implementations, the electronic device 190 also includes a location detection device 226 (e.g., a GPS module) and one or more sensors 228 (e.g., accelerometer, gyroscope, light sensor, etc.).

Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 202. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:

Operating system 232 including procedures for handling various basic system services and for performing hardware dependent tasks;

Network communication module 234 for connecting the electronic device 190 to other devices (e.g., the server system 140, one or more cast devices, one or more client devices, one or more smart home devices, and other electronic device(s) 190) via one or more network interfaces 204 (wired or wireless) and one or more networks 110, such as the Internet, other wide area networks, local area networks (e.g., local network 104), metropolitan area networks, and so on;

Input/output control module 236 for receiving inputs via one or more input devices and enabling presentation of information at the electronic device 190 via one or more output devices 218, including:

Voice processing module 238 for processing audio inputs or voice messages collected in an environment surrounding the electronic device 190, or preparing the collected audio inputs or voice messages for processing at a voice assistance server 112;

LED control module 240 for generating visual patterns on the LEDs 222 according to device states of the electronic device 190; and Touch sense module 242 for sensing touch events on a top surface (e.g., on touch sensor array 214) of the electronic device 190;

An internal clock 241 that is used by the electronic device 190 for audio;

Device/user data 243 for storing the device identification, one or more local network credentials/identifiers (e.g., Wi-Fi credentials), audio data for playback, and information associated with one or more users linked to the device 190, including login information, user credentials, and authentication information;

Voice activated device data 244 for storing at least data associated with the electronic device 190, including:

Voice device settings 246 for storing information associated with the electronic device 190 itself, including common device settings (e.g., service tier, device model, storage capacity, processing capabilities, communication capabilities, etc.), information of one or more user accounts in a user domain, settings regarding restrictions when dealing with a non-registered user, and display specifications associated with one or more visual patterns displayed by the LEDs 222;

Voice control data 248 for storing audio signals, voice messages, response messages and other data related to voice interface functions of the electronic device 190;

Voice models data 250 for storing voice models or voice fingerprints corresponding to users in the user domain that are associated with the electronic device 190;

Local synchronization module 252 for synchronization of audio amongst multiple electronic devices 190;

Audio playback module 254 for playing audio at the electronic device 190 as described in detail above; and Response module 256 for performing instructions included in voice request responses generated by the voice assistance server 112, and in some implementations, generating responses to certain voice inputs.

As illustrated in FIG. 2B, in some implementations, the voice processing module 238 includes the following modules:

User identification module 260 for identifying and disambiguating users who provide voice inputs to the electronic device 190;

Hotword recognition module 262 for determining whether voice inputs include a hotword for waking up the electronic device 190 and recognizing such in the voice inputs;

Request recognition module 264 for determining a user request included in a voice input; and Recognition quality module 266 for determining a measure of the quality (e.g., a score) of recognition of hotwords and/or requests in voice inputs.

As shown in FIG. 2C, in some implementations, the local synchronization module 552 includes the following modules whose operations were discussed in detail above:

Common clock module 280 for the offset between the internal clock 241 of the electronic device 190 and a common clock source 286 (also known as a master clock, e.g., as determined by the server 112 or as determined mutually amongst electronic devices 190);

Audio distribution module 282 for distributing audio data 288 (e.g., data from the voice assistant server 112 and/or content hosts 114) to electronic devices 190;

Timestamping module 284 for timestamping audio data; and

Error handling module 290 for handling errors in audio playback.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above. In some implementations, a subset of the programs, modules, and/or data stored in the memory 206 can be stored on and/or executed by the server system 140/voice assistance server 112.

In some implementations, one or more of the modules in memory 206 including the audio synchronization module 252 described above are part of a voice processing library of modules. The voice processing library may be implemented and embedded on a wide variety of devices. An example of a voice processing library is described in U.S. patent application Ser. No. 15/592,137, entitled "Implementations for Voice Assistant on Devices," filed May 10, 2017, which is incorporated by reference herein in its entirety.

Figure 3:
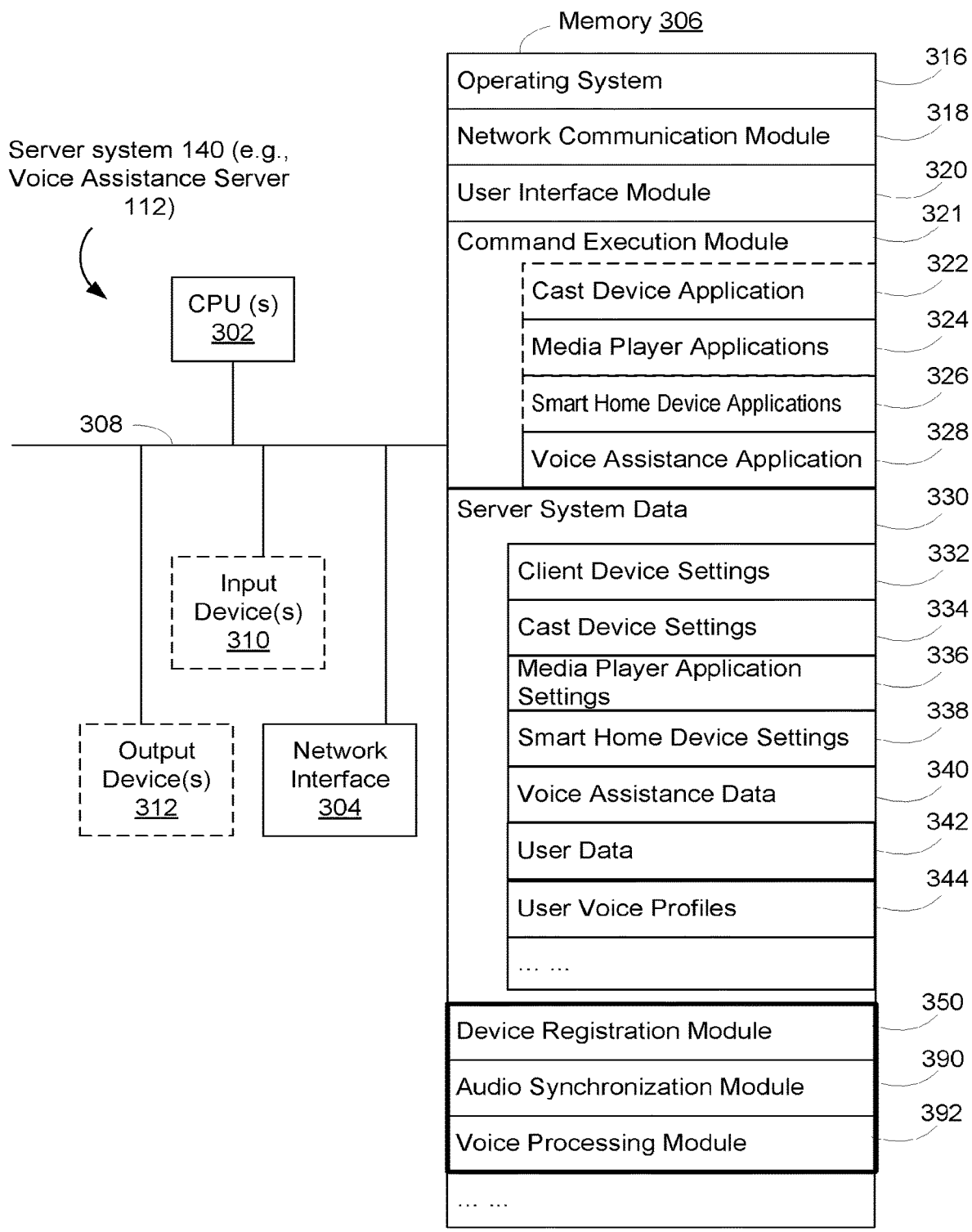
FIG. 3 is a block diagram illustrating an example server in the server system of an operating environment in accordance with some implementations.

FIG. 3 is a block diagram illustrating an example server in the server system 140 of an operating environment (e.g., operating environment 100) in accordance with some implementations. An example server is a voice assistance server 112 that is depicted in FIG. 1A. The server 140, typically, includes one or more processing units (CPUs) 302, one or more network interfaces 304, memory 306, and one or more communication buses 308 for interconnecting these components (sometimes called a chipset). The server 140 could include one or more input devices 310 that facilitate user input, such as a keyboard, a mouse, a voice-command input unit or microphone, a touch screen display, a touch-sensitive input pad, a gesture capturing camera, or other input buttons or controls. Furthermore, the server 140 could use a microphone and voice recognition or a camera and gesture recognition to supplement or replace the keyboard. In some implementations, the server 140 includes one or more cameras, scanners, or photo sensor units for capturing images, for example, of graphic series codes printed on the electronic devices. The server 140 could also include one or more output devices 312 that enable presentation of user interfaces and display content, including one or more speakers and/or one or more visual displays.

Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

- Operating system 316 including procedures for handling various basic system services and for performing hardware dependent tasks;
- Network communication module 318 for connecting the server system 140 to other devices (e.g., various servers in the server system 140, client devices, cast devices, electronic devices 190, and smart home devices) via one or more network interfaces 304 (wired or wireless) and one or more networks 110, such as the Internet, other wide area networks, local area networks, metropolitan area networks, and so on;
- User interface module 320 for enabling presentation of information (e.g., a graphical user interface for presenting application(s), widgets, websites and web pages thereof, and/or games, audio and/or video content, text, etc.) at a client device;
- Command execution module 321 for execution on the server side (e.g., games, social network applications, smart home applications, and/or other web or non-web based applications for controlling a client device, a cast device, an electronic device 190 and a smart home devices and reviewing data captured by such devices), including one or more of:
  - a cast device application 322 that is executed to provide server-side functionalities for device provisioning, device control, and user account management associated with cast device(s);
  - one or more media player applications 324 that is executed to provide server-side functionalities for media display and user account management associated with corresponding media sources;
  - one or more smart home device applications 326 that is executed to provide server-side functionalities for device provisioning, device control, data processing and data review of corresponding smart home devices; and
  - a voice assistance application 328 that is executed to arrange voice processing of a voice message received from the electronic device 190 or directly process the voice message to extract a user voice command and one or more parameters for the user voice command (e.g., a designation of a cast device or another electronic device 190); and
- Server system data 330 storing at least data associated with automatic control of media display (e.g., in an automatic media output mode and a follow-up mode), including one or more of:
  - Client device settings 332 for storing information associated with one or more client device, including common device settings (e.g., service tier, device model, storage capacity, processing capabilities, communication capabilities, etc.), and information for automatic media display control;
  - Cast device settings 334 for storing information associated with user accounts of the cast device application 322, including one or more of account access information, information for device settings (e.g., service tier, device model, storage capacity, processing capabilities, communication capabilities, etc.), and information for automatic media display control;
  - Media player application settings 336 for storing information associated with user accounts of one or more media player applications 324, including one or more of account access information, user preferences of media content types, review history data, and information for automatic media display control;
  - Smart home device settings 338 for storing information associated with user accounts of the smart home applications 326, including one or more of account access information, information for one or more smart home devices (e.g., service tier, device model, storage capacity, processing capabilities, communication capabilities, etc.);
  - Voice assistance data 340 for storing information associated with user accounts of the voice assistance application 328, including one or more of account access information, information for one or more electronic device 190 (e.g., service tier, device model, storage capacity, processing capabilities, communication capabilities, etc.);
  - User data 342 for storing information associated with users in the use domain, including users' subscriptions (e.g., music streaming service subscriptions, video streaming service subscriptions, newsletter subscriptions), user devices (e.g., devices registered in the device registry 118 associated with respective users), user accounts (e.g., users' email accounts, calendar accounts, financial accounts), electronic devices associated with the user account, and other user data; and
  - User voice profiles 344 for storing voice profiles of the users in the user domain, including, for example, voice models or voice fingerprints of the users and comfortable volume level thresholds of the users.
- Device registration module 350 for managing the device registry 118 coupled to the voice assistance server 112;
- Audio synchronization module 390 for synchronizing audio amongst the electronic devices 190; and
- Voice processing module 392 for processing audio inputs or voice messages collected in an environment surrounding the electronic device 190.

In some implementations, the voice assistance server 112 is primarily responsible for processing of voice inputs and for audio synchronization, and thus one or more of the programs, modules, and data structures in memory 206 described above with reference to FIGS. 2A-2C are included in respective modules in memory 306 (e.g., the programs, modules, and data structures included with voice processing module 238 are included in voice processing module 392, and the programs, modules, and data structures included with local synchronization module 252 are included in audio synchronization module 390). The electronic device 190 either transmits captured voice inputs to the voice assistance server 112 for processing, or first pre-processes the voice inputs and transmits the pre-processed voice inputs to the voice assistance server 112 for processing. In some implementations, the voice assistance server 112 and the electronic device 190 has some shared and some divided responsibilities regarding processing of voice inputs and sound synchronization, and the programs, modules, and data structures shown in FIGS. 2A-2C may be included in both or divided amongst the voice assistance server 112 and the electronic device 190. Other programs, modules, and data structures shown in FIGS. 2A-2C (e.g., voice models data 550, voice model training module 554), or analogues thereof, may also be included in the voice assistance server 112.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

Example Audio Synchronization

Figure 4A:
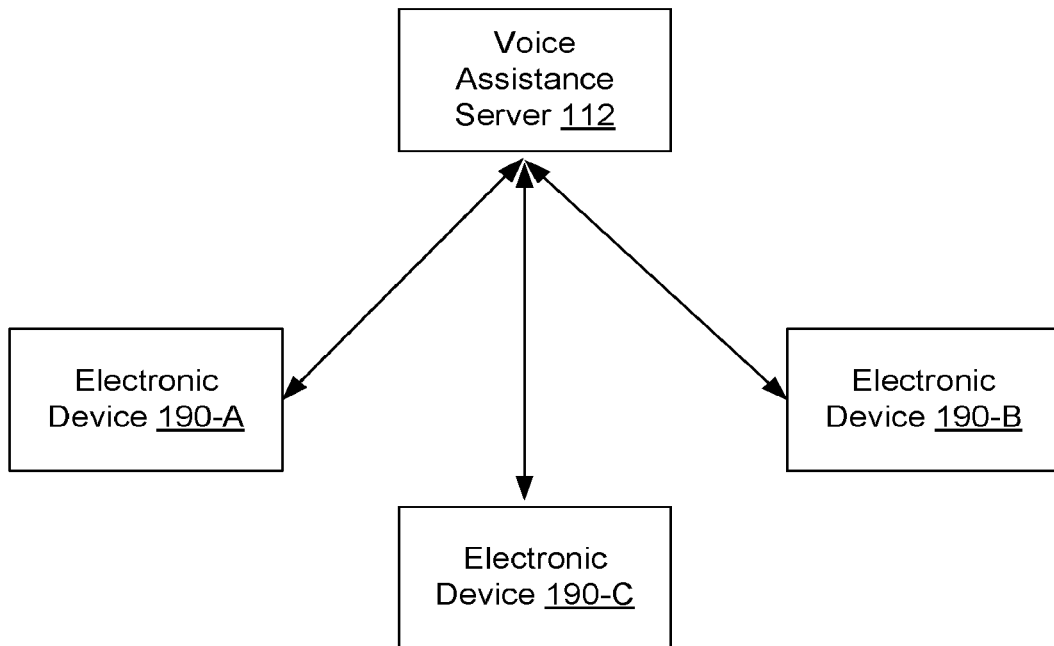
FIGS. 4A and 4B illustrate examples of sound synchronization between multiple electronic devices (e.g., electronic devices 190) in accordance with some implementations.
Figure 4B:
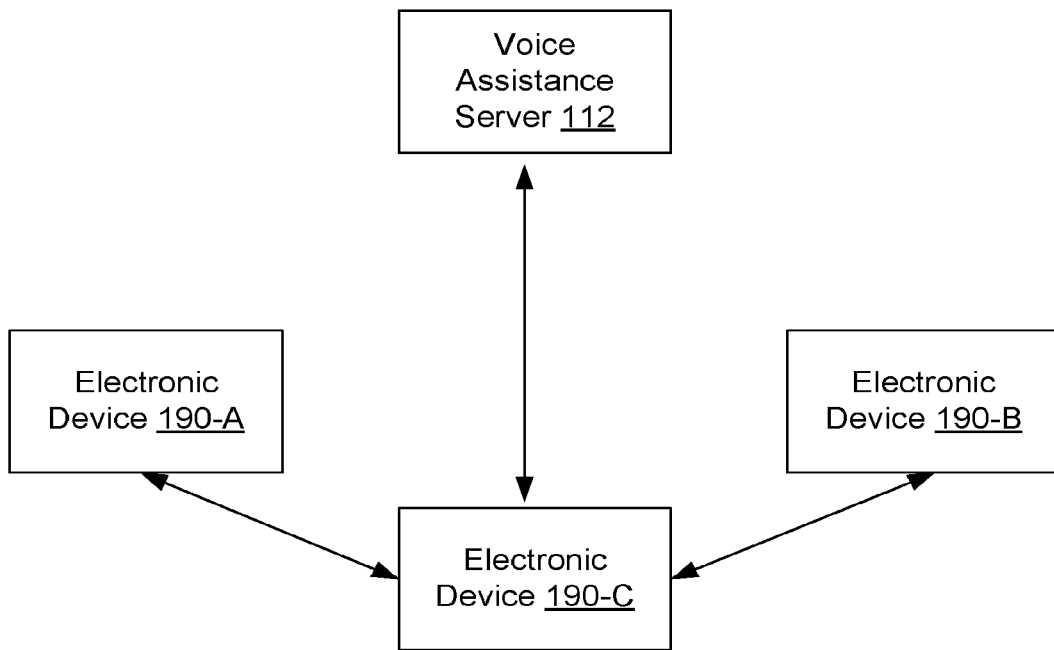

FIGS. 4A and 4B illustrate examples of sound synchronization between multiple electronic devices (e.g., electronic devices 190) in accordance with some implementations. In FIG. 4A, as the double arrows indicate, a server (e.g., the voice assistance server 112) orchestrates the sound synchronization between multiple electronic devices (e.g., devices 190-A, 190-B, and 190-C), according to some implementations. In this example, the server 112 defines a common clock for the electronic devices 190-A, 190-B, and 190-C (e.g., by identifying a common clock device from the electronic devices 190-A, 190-B, and 190-C), distributes audio data to the devices after timestamping the audio data, and ensures that the devices plays audio at the correct time corresponding to the timestamp. FIG. 4B, on the other hand, illustrates another example where a server chooses a leader amongst the electronic devices, and that leader coordinates sound synchronization amongst the devices, according to some implementations. For the example shown, server 112 selects a leader (device 190-C in this case), and sends the audio data to device 190-C to be played back by devices 190-A, 190-B, and 190-C. Device 190-C coordinates with the other two devices in determining a common clock, timestamps the audio data, and monitors the devices for the correct playback. Although not shown, the devices may exchange information (independent of the leader) to facilitate audio synchronization. Various other task partitioning can be used to achieve sound synchronization amongst the devices. For example, server 112 could monitor the devices 190-A, 190-B, and 190-C while device 190-C facilitates the synchronization.

Example Voice Assistant Operating Environment and Libraries

Figure 5A:
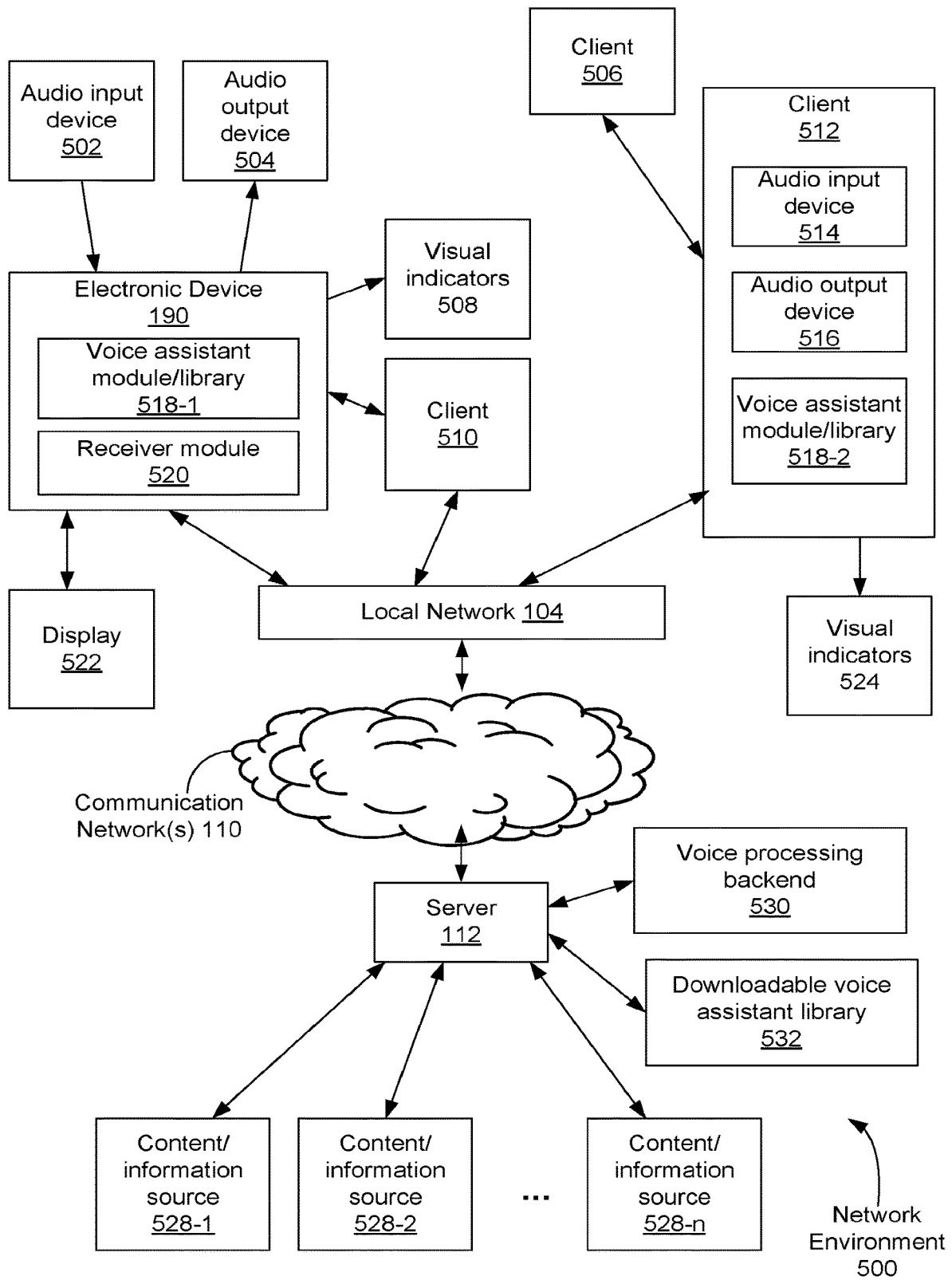
FIG. 5A is a block diagram illustrating an example network environment.

FIG. 5A illustrates a network environment 500 in accordance with some implementations. The network environment 500 includes an electronic device 190 and/or a voice assistant client device 512. In some implementations, the electronic device 190 is a casting device (e.g., CHROMECAST by GOOGLE INC.) that is directly or otherwise communicatively coupled to an audio input device 502 (e.g., a microphone) and an audio output device 504 (e.g., one or more speakers). In some implementations, both the audio input device 502 and the audio output device 504 are components of a device (e.g., speaker system, television, sound bar) communicatively coupled to the electronic device 190. In some implementations, the audio input device 502 is a component of the electronic device 190 (e.g., the audio input device 502 is the microphone 216), and the audio output device 504 is a component of a device to which the electronic device 190 is communicatively coupled, or vice versa. In some implementations, the audio input device 502 and the audio output device 504 are components of the electronic device 190.

In some implementations, the electronic device 190 is communicatively coupled to a client 510. The client 510 may include an application or module (e.g., an application used for electronic device settings) that facilitates configuration of the electronic device 190, including voice assistant features.

The electronic device 190 is communicatively coupled, through communication networks 110, to a server 112. The electronic device 190 is communicatively coupled to a local network 104, which is communicatively coupled to the communication networks 110. In some implementations, the local network 104 is a local area network implemented at a network interface (e.g., a router). The electronic device 190 that is communicatively coupled to the local network 104 may also communicate with other electronic devices (e.g., client 510, client 512) through the local network 104.

Optionally, the electronic device 190 is communicatively coupled to the communication networks 110 and is not on the local network 104. For example, the electronic device 190 is not on the Wi-Fi network corresponding to the local network 104 but is connected to the communication networks 110 through a cellular connection. In some implementations, communication between electronic device 190 and other client devices (e.g., client 510, client 512) that are on the local network 104 and client devices that are not on the local network 104 are done through the voice assistance server 112. The electronic devices 190 are registered in a device registry 118 of the voice assistant service and thus known to the voice assistance server 112.

In some implementations, the electronic device 190 is coupled to a display 522. In some implementations, the electronic device 190 includes one or more visual indicators 508 (e.g., the LED lights 222 of FIG. 2A). In some implementations, the electronic device 190 includes a receiver module 520. In some implementations, the receiver module 146 operates the electronic device 190, including hardware functions and communicating with a content source, for example. In some implementations, there are different receiver modules 520 at the electronic device 190 for different content sources. In some implementations, the receiver module 146 includes respective sub-modules for different content sources.

The voice assistant client device 512 (e.g., a smartphone, a laptop or desktop computer, a tablet computer, a voice command device, a mobile device or in-vehicle system with GOOGLE ASSISTANT by GOOGLE INC., GOOGLE HOME by GOOGLE INC.) includes an audio input device 514 (e.g., a microphone) and an audio output device 516 (e.g., one or more speakers, headphones). In some implementations, a voice assistant client device 512 is communicatively coupled to a client 506 (e.g., a smartphone, a tablet device). The client 506 may include an application or module (e.g., a voice command device settings app) that facilitates configuration of the voice assistant client device 512, including voice assistant features.

In some implementations, the voice assistant client device 512 includes one or more visual indicators 524 (e.g., LED lights). An example of a voice assistant client device with visual indicators (e.g., LED lights) is illustrated in FIG. 4A of U.S. Provisional Application No. 62/336,566, titled "LED Design Language for Visual Affordance of Voice User Interfaces," filed May 13, 2016, which is incorporated by reference herein in its entirety.

The electronic device 190 and the voice assistant client device 512 include respective instances of a voice assistant module or library 518. The voice assistant module/library 518 is a module/library that implements voice assistant functionality across a variety of devices (e.g., electronic device 190, voice assistant client device 512). The voice assistant functionality is consistent across the variety of devices, while still allowing for device-specific features (e.g., support for controlling device-specific features through the voice assistant). In some implementations, the voice assistant module or library 518 is the same or similar across devices; instances of the same library can be included in a variety of devices.

In some implementations, depending on the type of device, the voice assistant module/library 518 is included in an application installed in the device, in the device operating system, or embedded in the device (e.g., embedded in the firmware). In some implementations, the voice assistant module/library 518-1 at the electronic device 190 communicates with the receiver module 520 to perform voice assistant operations. In some implementations, the voice assistant module/library 518-1 at the electronic device 190 can control or otherwise affect the visual indicators 508. In some implementations, the voice assistant module/library 518-2 at the voice assistant client device 512 can control or otherwise affect the visual indicators 524.

The electronic device 190 and the voice assistant client device 512 are communicatively coupled to a server system 140 through one or more communicative networks 110 (e.g., local area networks, wide area networks, the Internet). The voice assistant module/library 518 detects (e.g., receives) verbal input picked up (e.g., captured) by the audio input device 502, processes the verbal input (e.g., to detect hotwords), and transmits the processed verbal input or an encoding of the processed verbal input to the server 112. The server 112 receives the processed verbal input or an encoding thereof, and processes the received verbal input to determine the appropriate response to the verbal input. The appropriate response may be content, information, or instructions or commands or metadata to the electronic device 190 or voice assistant client device 512 to perform a function or operation. The server 112 sends the response to the electronic device 190 or voice assistant client device 512, where the content or information is output (e.g., output through audio output device 506) and/or a function is performed. As part of the processing, the server 112 may communicate with one or more content or information sources 528 to obtain content or information, or references to such, for the response. In some implementations, the content or information sources 528 include, for example, search engines, databases (e.g., audio databases), information associated with the user's account (e.g., calendar, task list, email), websites, and media streaming services. In some implementations, a voice assistant client device 512 and an electronic device 190 may communicate or interact with each other. Examples of such communication or interaction, as well as example operations of a voice assistant client device 164 (e.g., GOOGLE HOME by GOOGLE INC.) are described in U.S. Provisional Application No. 62/336,569, titled "Voice-Controlled Closed Caption Display," filed May 13, 2016, and U.S. Provisional Application No. 62/336,565, titled "Media Transfer among Media Output Devices," filed May 13, 2016, all of which are incorporated by reference herein in their entirety.

In some implementations, the voice assistant module/library 518 receives verbal input captured by the audio input device 502 and transmits the verbal input (with no or little processing) or an encoding thereof to the server 112. The server 112 processes the verbal input to detect hotwords, determine an appropriate response, and send the response to the electronic device 190 or voice assistant client device 164.

If the server 112 determines that the verbal input includes a command for the electronic device 190 or the voice assistant client device 512 to perform a function, the server 112 transmits in the response instructions or metadata that instructs the electronic device 190 or the voice assistant client device 512 to perform the function. The function may be specific to the device, and capability for supporting such functions in the voice assistant may be included in the electronic device 190 or client 512 as a custom module or function added or linked to the voice assistant module/library 518.

In some implementations, the server 112 includes, or is coupled to, a voice processing backend 530 that performs the verbal input processing operations and determines responses to the verbal inputs, including retrieving audio data that has been identified by the server 112 for playback by one or more of the electronic device 190 (e.g., via the audio output device 504) and the voice assistant client device 512. In some implementations, the server 112 includes downloadable voice assistant library 532. The downloadable voice assistant library 532 (e.g., same as voice assistant library 518, or an update thereof) may include new features and functionality or updates, and can be downloaded to add the voice assistant library to a device or to update a voice assistant library 518.

Figure 5B:
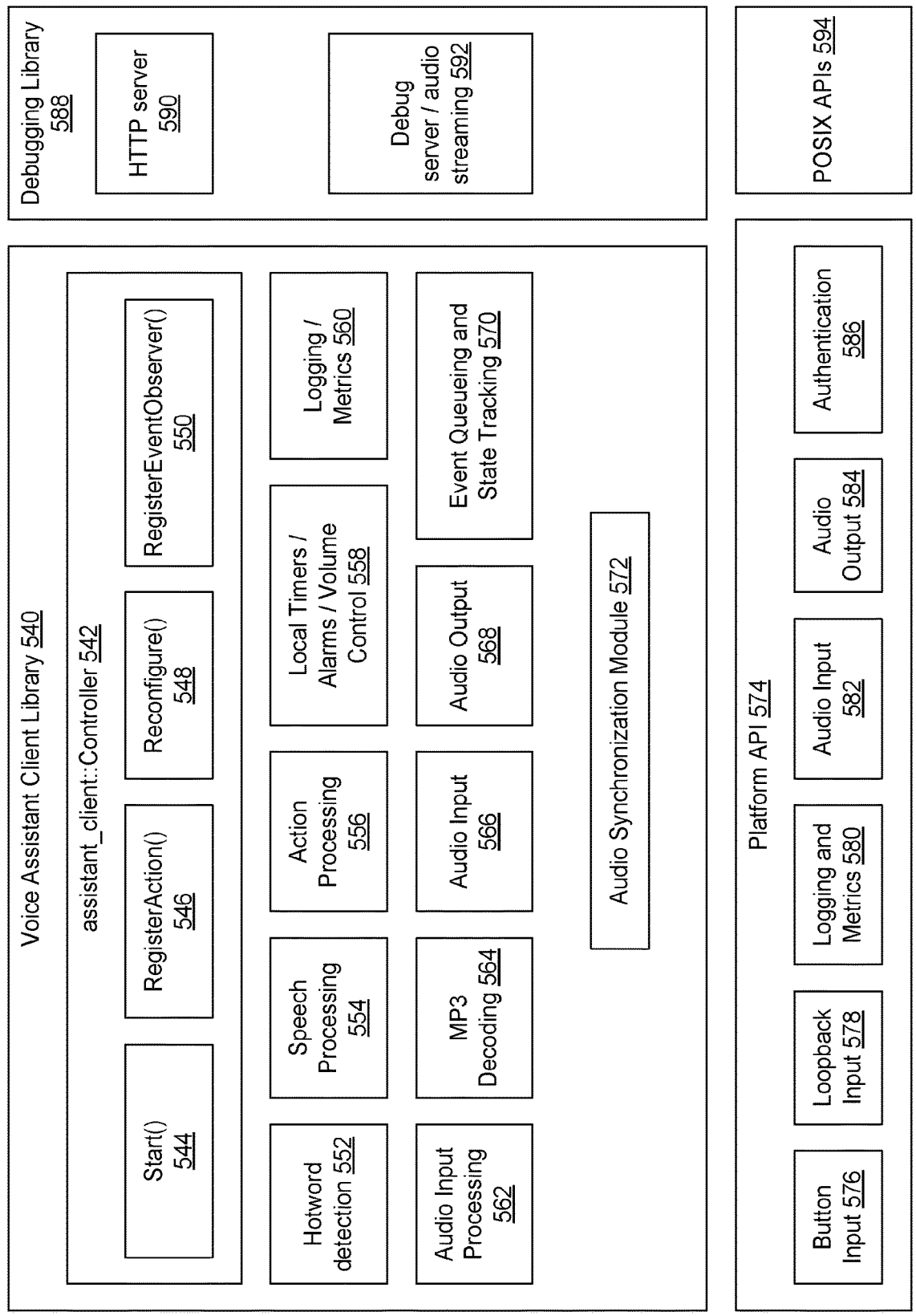
FIG. 5B is a block diagram illustrating a functional view of voice assistant libraries with audio synchronization module, in accordance with some implementations.

FIG. 5B illustrates the libraries and APIs that may be stored in a voice assistant client device 512 or electronic device 190, and run by the voice assistant module 518 or another application. The libraries and APIs may include a voice assistant client library 540, a debugging library 588, a platform API 574, and POSIX APIs 594. Applications at the voice assistant client device 512 or electronic device 190 (e.g., voice assistant module 518, other applications that may want to support cooperation with the voice assistant) may include or link to, and run, the libraries and APIs to provide or support voice assistant functionality in the application. In some implementations, the voice assistant client library 540 and the debugging library 588 are separate libraries; keeping the voice assistant client library 540 and the debugging library 588 libraries separate facilitates different release and update procedures that accounts for the different security implications of these libraries.

In some implementations, the libraries are flexible; the libraries may be used across multiple device types and incorporate the same voice assistant functionality. In some implementations, the libraries depend on standard shared objects (e.g., standard Linux shared objects), and thus are compatible with different operating systems or platforms that use these standard shard objects (e.g., various Linux distributions and flavors of embedded Linux). In some implementations, the POSIX APIs 594 provide standard APIs for compatibility with various operating systems. Thus, the voice assistant client library 540 may be included in devices of different POSIX-compliant operating systems and the POSIX APIs 594 provides a compatibility interface between the voice assistant client library 540 and the different operating systems. In some implementations, the libraries include modules to support and facilitate base use cases available across the different types of devices that implement the voice assistant (e.g., timers, alarms, volume control).

In some implementations, one or more of the modules in memory 206 (described above in reference to FIG. 2A), including the audio synchronization module 252, are part of the voice assistant client library 540. In FIG. 5B, the audio synchronization module 572 incorporates the operations described above in reference to the audio synchronization module 252 of FIG. 2A, according to some implementations. The voice processing library may be implemented and embedded on a wide variety of devices. An example of a voice processing library is described in U.S. patent application Ser. No. 15/592,137, entitled "Implementations for Voice Assistant on Devices," filed May 10, 2017, which is incorporated by reference herein in its entirety.

Example Process for Sound Synchronization

Figure 6A:
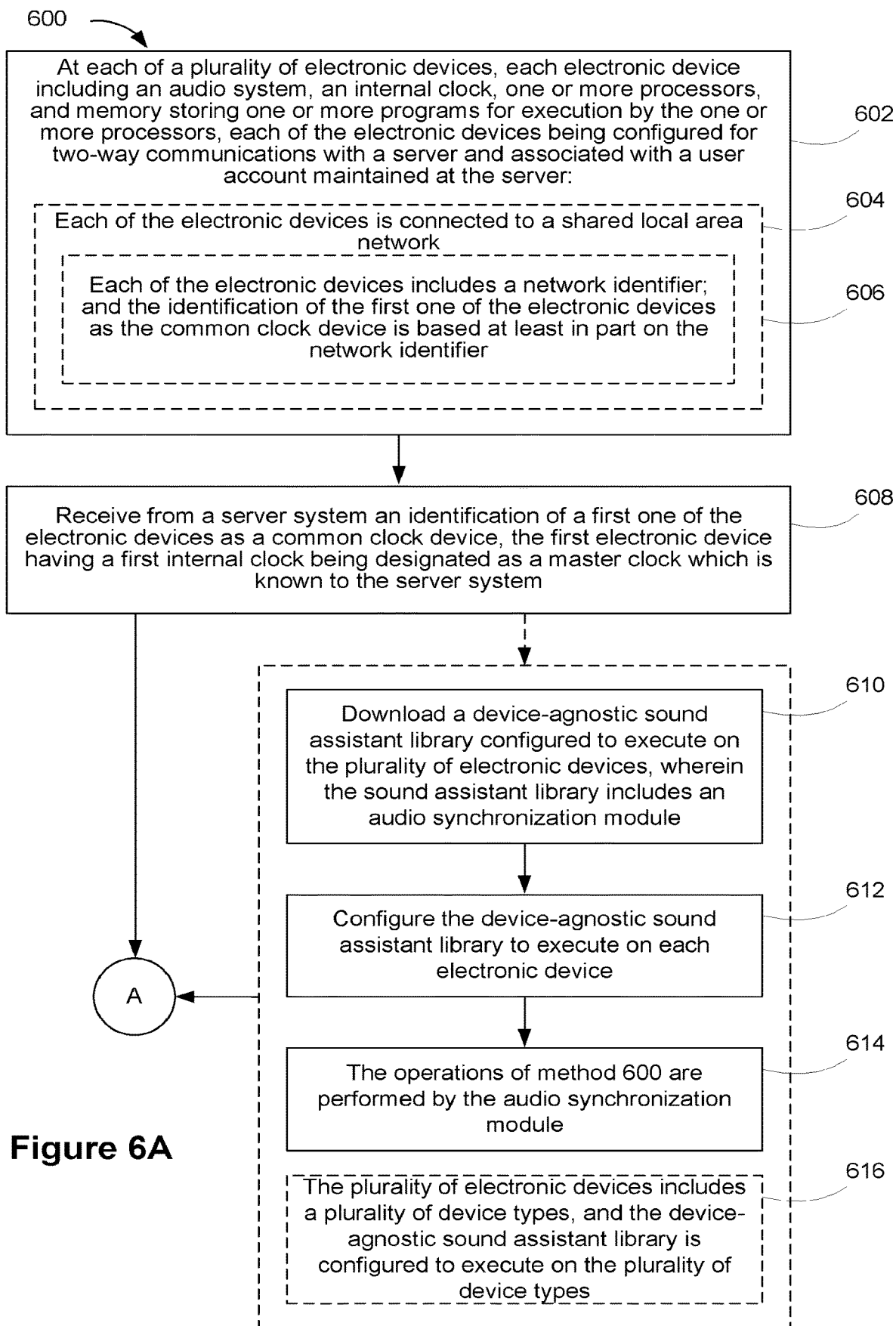
FIGS. 6A-6C show a flow diagram illustrating a method for synchronous audio playback, in accordance with some implementations.
Figure 6B:
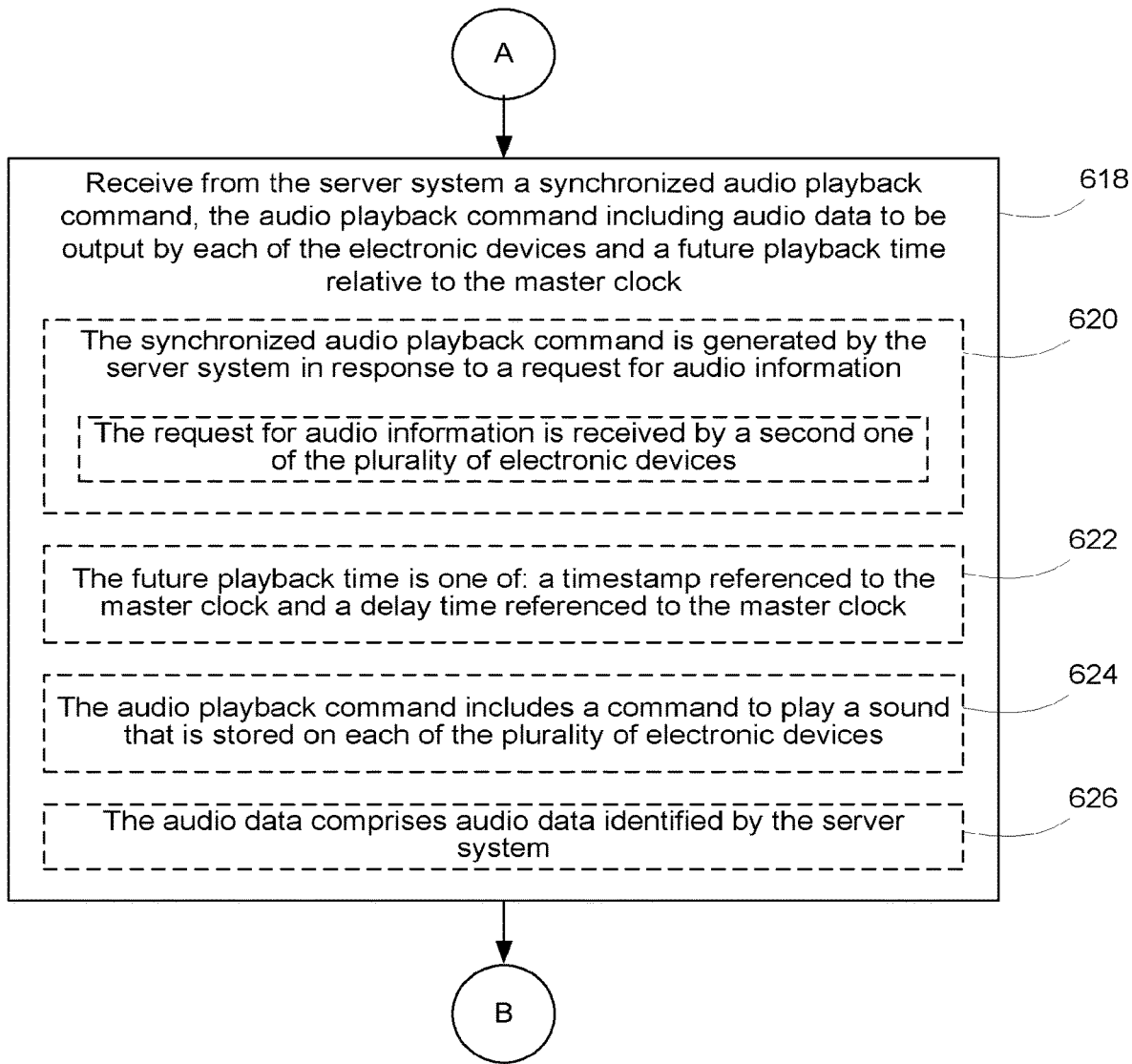
Figure 6C:
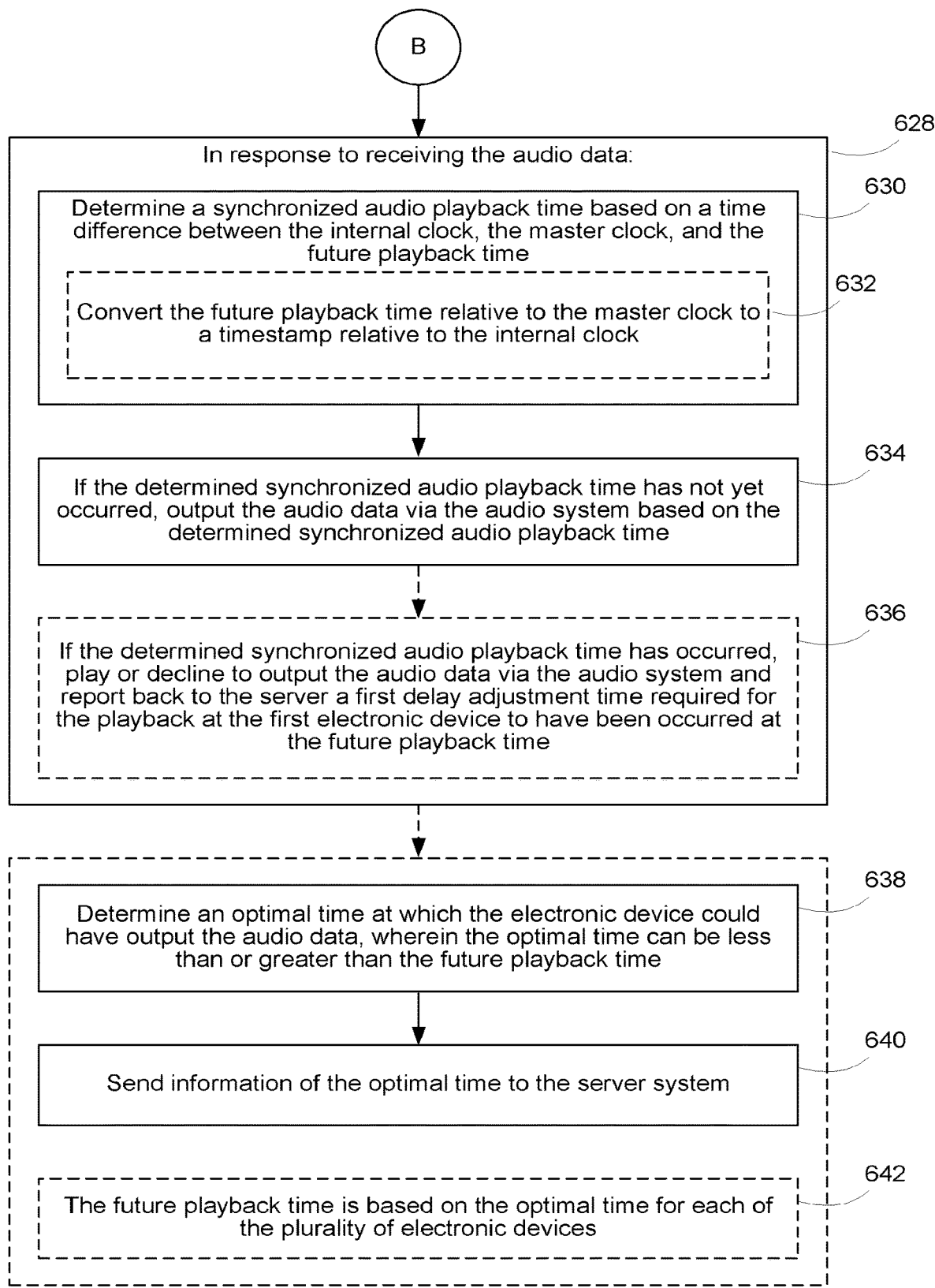
Figure 7A:
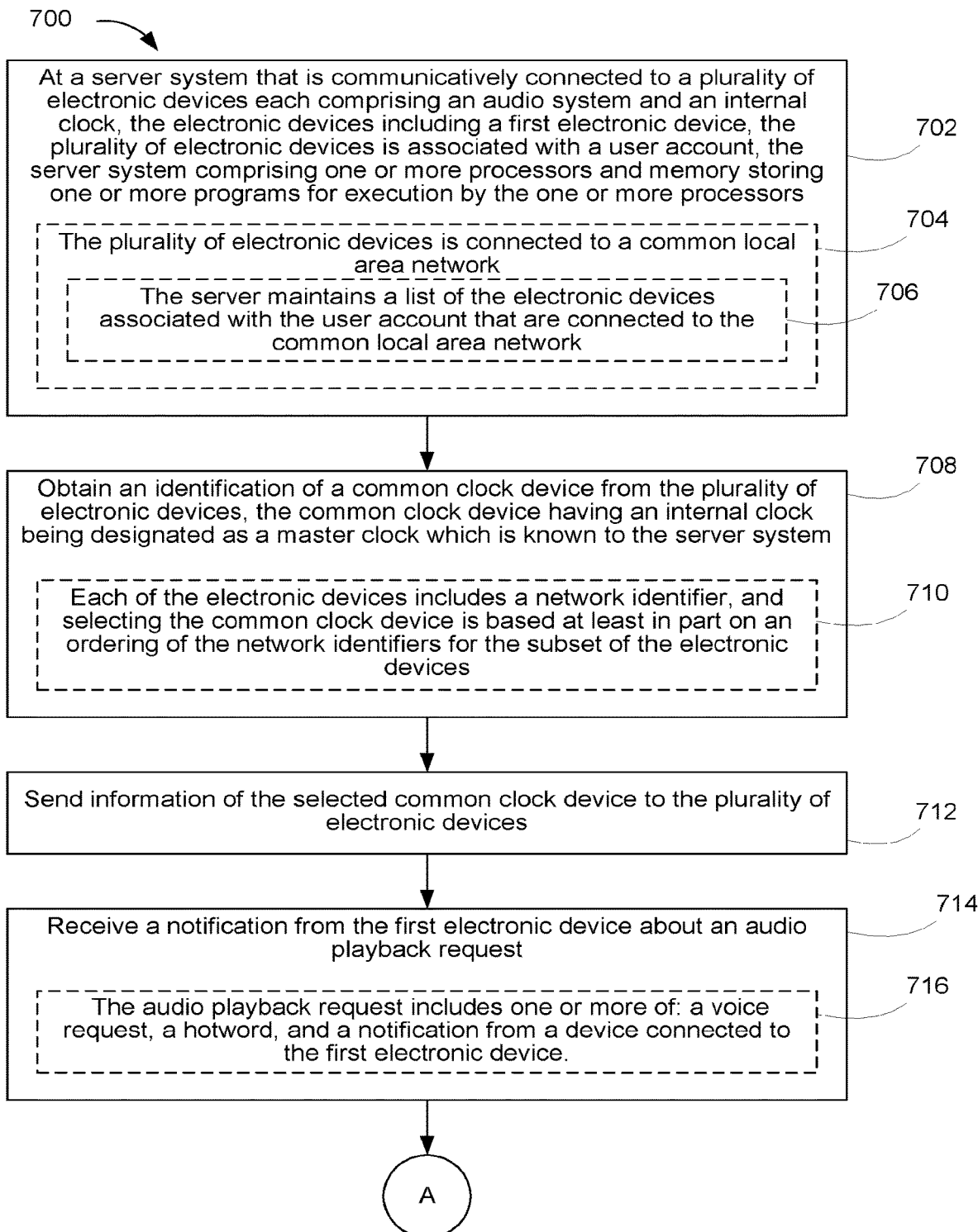
FIGS. 7A-7D show a flow diagram illustrating a method for synchronous audio playback, in accordance with some implementations.
Figure 7B:
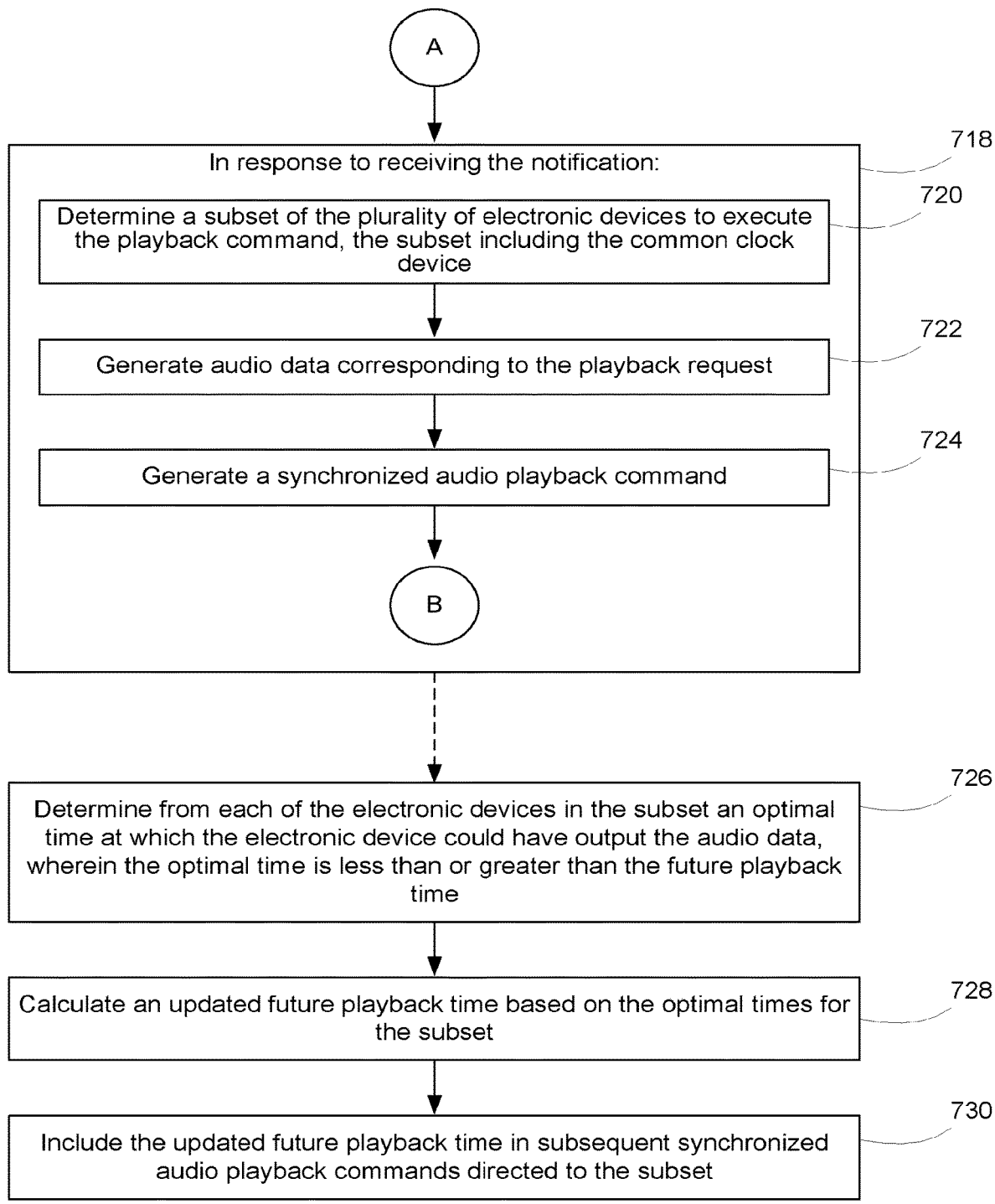
Figure 7C:
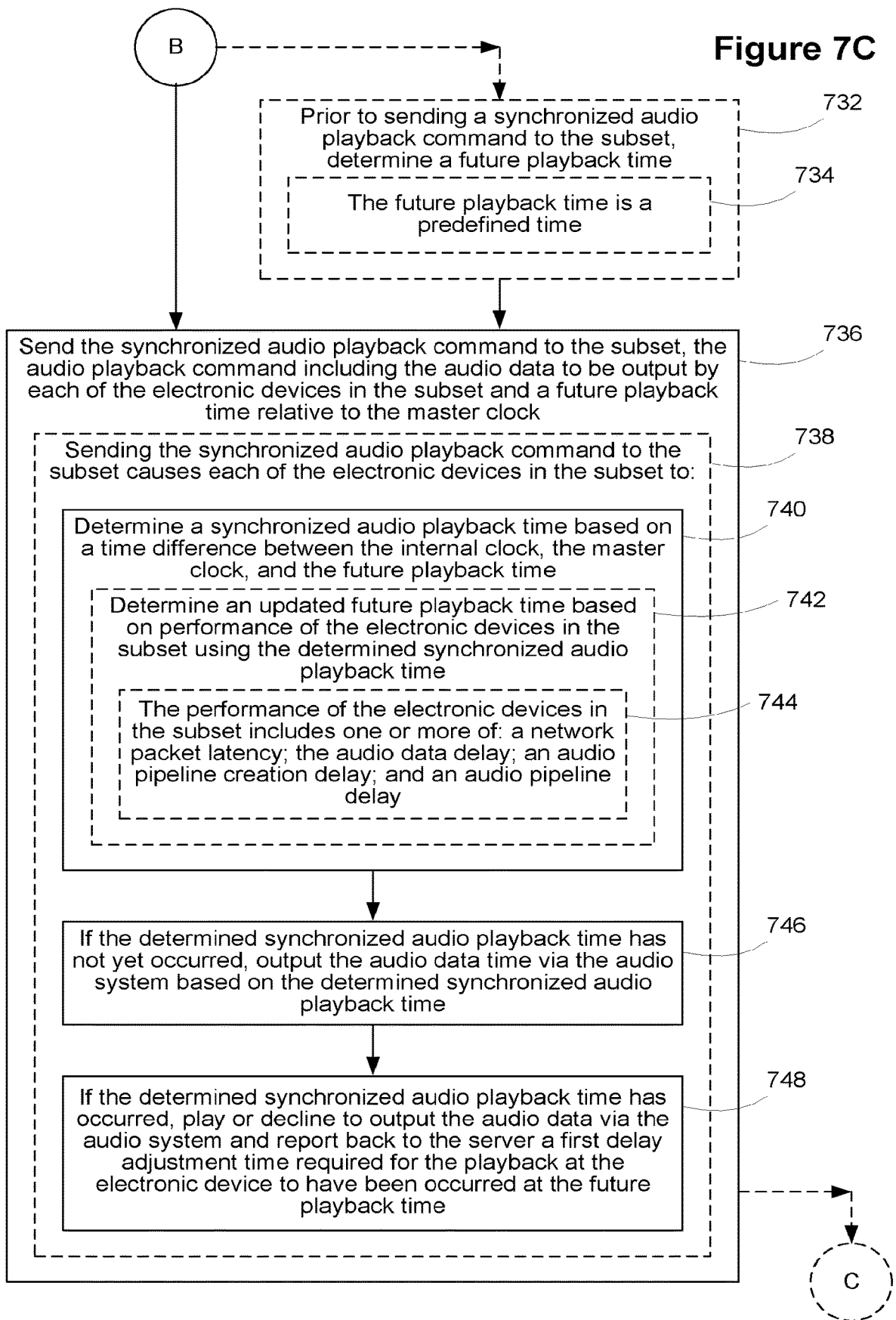
Figure 7D:
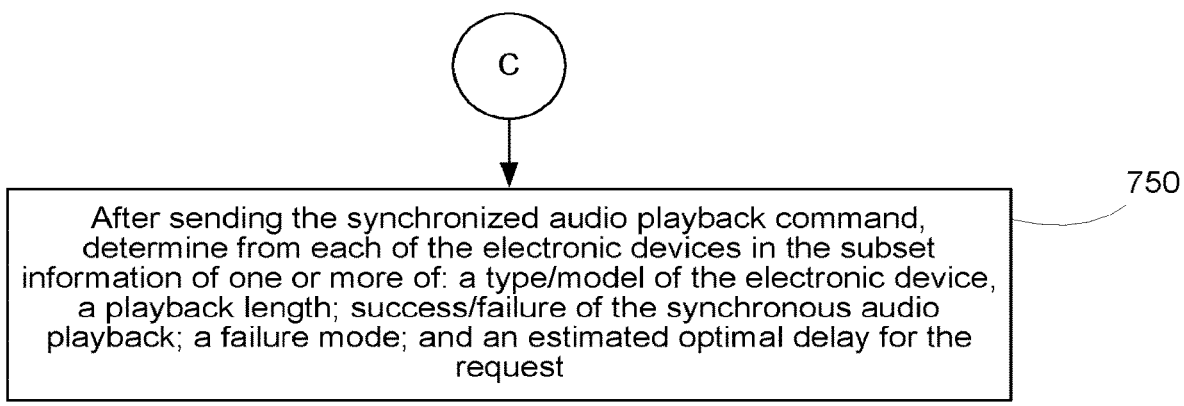

FIGS. 6A-6C show a flow diagram illustrating a method 600 for synchronous audio playback, in accordance with some implementations. The method 600 is implemented (602) at each of a plurality of electronic devices (e.g., electronic device 190). In some implementations, the method 600 is implemented in an audio synchronization module (e.g., module 572 in FIG. 5B, or the local synchronization module 252 in FIG. 2C). Each electronic device (e.g., voice-activated electronic device 190-1, 190-2, 190-N) of the plurality of electronic devices 190 includes an audio system (e.g., speaker 520 and/or microphone 216), an internal clock 241, one or more processors 202, and memory 206 storing one or more programs for execution by the one or more processors. Each of the electronic devices is configured for two-way communications with a server and associated with a user account maintained at the server. In some implementations, the audio system includes one or more speakers 520. In some implementations, the audio system includes one or more microphones 216. In some implementations, each of the electronic devices is connected (604) to a shared local area network (e.g., a Wi-Fi network or a proprietary mesh network; local network 104). In some implementations, each of the electronic devices includes (606) a network identifier; and the identification of the first one of the electronic devices as the common clock device is based at least in part on the network identifier. In some implementations, the common clock device is the electronic device that has the lowest network identifier.

The method 600 includes receiving (608), by a common clock module (e.g., module 580) of the electronic device 190, from a server system (e.g., voice assistant server 112) an identification of a first one of the electronic devices as a common clock device. The first electronic device has a first internal clock being designated as a master clock which is known to the server system. In some implementations, the common clock module stores the identity of the common clock device as the common clock source (e.g., common clock source 586).

In some implementations, the method includes: downloading (610), by the electronic device 190, a device-agnostic sound assistant library (e.g., library 518; described above in reference to FIGS. 5A and 5B) configured to execute on the plurality of electronic devices, wherein the sound assistant library includes an audio synchronization module (e.g., module 572). The method further includes configuring (612), at the electronic device 190, the device-agnostic sound assistant library to execute on each electronic device. The operations of the method are performed (614) by the audio synchronization module 572. In some implementations, the plurality of electronic devices includes (616) a plurality of device types, and the device-agnostic sound assistant library is configured to execute on the plurality of device types.

The method includes receiving (618), by an audio distribution module (e.g., module 282) of the electronic device 190, from the server system (e.g., server 112) a synchronized audio playback command, the audio playback command including audio data (e.g., stored as audio data 288) to be output by each of the electronic devices and a future playback time (e.g., a timestamp) relative to the master clock. In some implementations, the synchronized audio playback command is generated (620) by the server system (e.g., server 112) in response to a request for audio information (not shown). In some implementations, the request is a verbal request received from a user via a microphone (e.g., the microphone 216) of the audio system. For example, the user could request to play the audio data at the common clock time. In some implementations, the request for audio information is received (622) by a second one of the plurality of electronic devices 190. In some implementations, the future playback time is one of: a timestamp referenced to the master clock and a delay time referenced to the master clock. In some implementations, the audio playback command includes (624) a command to play a sound (e.g., a doorbell sound) that is stored on each of the plurality of electronic devices 190 (e.g., in the device/user data 243). In some implementations, the audio data comprises (626) audio data identified by the server system (e.g., by server 112).

In response (628) to receiving the audio data, an audio playback module (e.g., module 254) in the electronic device 190 determines (630) a synchronized audio playback time based on a time difference between the internal clock 241, the master clock (e.g., the common clock source 286), and the future playback time. In some implementations, the electronic device 190 converts (632) the future playback time relative to the master clock 286 to a timestamp relative to the internal clock 241. If the determined synchronized audio playback time has not yet occurred, the electronic device 190 outputs (634) the audio data via the audio system based on the determined synchronized audio playback time. In some implementations, if the determined synchronized audio playback time has occurred (636), the audio playback module (e.g., module 254) in the electronic device 190 plays or declines to output the audio data via the audio system and reports back to the server (e.g., server 112) a first delay adjustment time required for the playback at the first electronic device to have been occurred at the future playback time. In some implementations, if the determined synchronized audio playtime time has occurred, the audio playback module plays the audio data out of sync, or plays a fragment of the audio data in sync.

In some implementations, the electronic device 190 determines (638), using a timestamp module (e.g., module 284), an optimal time at which the electronic device 190 could have output the audio data, wherein the optimal time can be less than or greater than the future playback time; and sends (640) information of the optimal time to the server system (e.g., server 112). In other words, there is a time difference between the determined synchronized audio playback time and the actual time that the device can playback. In some implementations, the optimal time is an earliest possible delay time, e.g., the earliest time at which the device could play back the sound. In some implementations, the future playback time is based (642) on the optimal time for each of the plurality of electronic devices 190. In some implementations, the future playback time is set to the longest (e.g., largest) one of the optimal times reported by the electronic devices 190.

FIGS. 7A-7D show a flow diagram illustrating a method 700 for synchronous audio playback, in accordance with some implementations. The method 700 is implemented (702) at a server system 112 that is communicatively connected to a plurality of electronic devices (e.g., devices 190) each comprising an audio system and an internal clock. In some implementations, the method 700 is implemented in an audio synchronization module (e.g., audio synchronization module 390 in FIG. 3). The electronic devices 190 include a first electronic device, and the plurality of electronic devices is associated with a user account. The server system 112 comprises one or more processors 302 and memory 306 storing one or more programs for execution by the one or more processors 302. In some implementations, the plurality of electronic devices 190 is connected (704) to a common local area network (e.g., network 104). In some implementations, the server maintains (706) a list of the electronic devices associated with the user account that are connected to the common local area network (e.g., in user data 342).

The server 112 obtains (708) an identification of a common clock device (e., one of the electronic devices 190) from the plurality of electronic devices 190. The common clock device has an internal clock being designated as a master clock which is known to the server system 112. In some implementations, each of the electronic devices 190 includes a network identifier, and the server 112 selects (710) the common clock device based at least in part on an ordering of the network identifiers for the subset of the electronic devices. In some implementations, the server 112 selects the common clock device based on one or more device characteristics, such as permanence of device on local network (e.g., mobile device is only present sometimes, device is powered off for substantial time periods), or reliability of clock maintained by device.

The server 112 sends (712) information of the selected common clock device to the plurality of electronic devices 190. The server 112 receives (714) a notification from the first electronic device about an audio playback request. In some implementations, the audio playback request includes (716) one or more of: a voice request (e.g., "set an alarm in 5 minutes"), a hotword (e.g., "Hey Google"), and a notification (e.g., a notification that there is a motion in the driveway) from a device (e.g., a client device) connected to the first electronic device.

In response to receiving the notification (718), the server 112 determines or identifies (720) a subset of the plurality of electronic devices 190 to execute the playback command, the subset including the common clock device; generates or identifies (722) audio data corresponding to the playback request; and generates (724) a synchronized audio playback command.

The server 112 sends (736) the synchronized audio playback command to the subset. The audio playback command includes the audio data to be output by each of the electronic devices in the subset and a future playback time (e.g., a timestamp) relative to the master clock. In some implementations, sending the synchronized audio playback command (by server 112) to the subset causes (738) each of the electronic devices in the subset to: determine (740) a synchronized audio playback time based on a time difference between the internal clock, the master clock, and the future playback time; if the determined synchronized audio playback time has not yet occurred, output (746) the audio data via the audio system based on the determined synchronized audio playback time; and, if the determined synchronized audio playback time has occurred, play or decline (748) to output the audio data via the audio system and report back to the server 112 a first delay adjustment time required for the playback at the electronic device to have been occurred at the future playback time. In some implementations, if the determined synchronized audio playtime time has occurred, the subset of electronic devices may play (e.g., output) the audio data out of sync, or play (e.g., output) a fragment of the audio data in sync. In some implementations, determining (740) a synchronized audio playback time includes determining (742) an updated future playback time based on performance of the electronic devices in the subset using the determined synchronized audio playback time. In some implementations, the performance of the electronic devices in the subset includes (744) one or more of a network packet latency, the audio data delay, an audio pipeline creation delay (e.g., for each electronic device 190), and an audio pipeline delay (e.g., for each device 190). In some implementations, after sending the synchronized audio playback command, the server 112 determines (750) from each of the electronic devices in the subset information of one or more of: a type/model of the electronic device (e.g., Google Home™, Google Home Mini™), a playback length; success/failure of the synchronous audio playback; a failure mode (e.g., whether the device failed to play or played late); and an estimated optimal delay for the request. In some implementations, the server 112 analyzes success of the devices (in playing back audio at and adjusts playback delay based on these parameters (e.g., by performing Artificial Intelligence analysis or by applying machine learning techniques).

In some implementations, prior to sending a synchronized audio playback command to the subset, the server 112 determines (732) a future playback time. In some implementations, the future playback time is (734) a predefined time (known to the server 112). In some implementations, the future playback time is predefined by the server.

In some implementations, the server 112 determines (726) from each of the electronic devices in the subset an optimal time (e.g., earliest possible delay time) at which the electronic device could have output the audio data, wherein the optimal time is less than or greater than the future playback time. The server 112 calculates (728) an updated future playback time based on the optimal times for the subset, and includes (730) the updated future playback time in subsequent synchronized audio playback commands directed to the subset.

Reference has been made in detail to implementations, examples of which are illustrated in the accompanying drawings. In the detailed description above, numerous specific details have been set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first device could be termed a second device, and, similarly, a second device could be termed a first device, without departing from the scope of the various described implementations. The first device and the second device are both types of devices, but they are not the same device.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method for synchronous audio playback, comprising:
receiving, by a first electronic device, from a server system, an identification of a second electronic device, the second electronic device having a designated master clock;
receiving, by the first electronic device, from the server system, a synchronized audio playback command, the synchronized audio playback command including audio data to be output and a future playback time relative to the designated master clock;
in response to receiving the audio data, determining, by the first electronic device, a synchronized audio playback time based on an internal clock of the first electronic device, the designated master clock of the second electronic device, and the future playback time;
calculating, by the first electronic device, a time for the first electronic device to output the audio data based on the synchronized audio playback time and an actual time that the first electronic device is able to perform playback; and
transmitting, by the first electronic device, information indicative of the time to the server system.

2. The method of claim 1, further comprising:
receiving, by the first electronic device, from the server system, a second synchronized audio playback command, the second synchronized audio playback command including a second set of audio data to be output and a second future playback time relative to the designated master clock, wherein, the second future playback time is based at least in part on the time.

3. The method of claim 2, wherein the first electronic device is part of a plurality of electronic devices that each output the audio in synchronization.

4. The method of claim 3, wherein the second future playback time is based at least in part on a plurality of times, including the time, received from the plurality of electronic devices.

5. The method of claim 1, wherein the time is calculated based upon a difference between the synchronized audio playback time and the actual time.

6. The method of claim 1, further comprising:
outputting, by the first electronic device using a speaker, the audio data based on the determined synchronized audio playback time.

7. The method of claim 1, wherein a memory of the first electronic device stores a device-agnostic sound assistant library that includes an audio synchronization module.

8. The method of claim 1, wherein the audio data is output via a speaker based on the determined synchronized audio playback time if the determined synchronized audio playback time has not yet occurred.

9. The method of claim 1, further comprising:
if the determined synchronized audio playback time has already occurred, declining to output the audio data and reporting back to the server system a first delay adjustment time required for playback at the first electronic device.

10. An electronic device comprising:
a network interface for communicating with a server;
a memory maintaining an internal clock;
a speaker system; and
a processing system interfacing with the network interface and the memory, and configured to:

receive, from a server system, an identification of a second electronic device, the second electronic device having an internal clock designated as a master clock;

receive, from the server system, a synchronized audio playback command, the synchronized audio playback command including audio data to be output and a future playback time relative to the master clock;

in response to receiving the audio data, determine a synchronized audio playback time based on an internal clock of the electronic device, the master clock of the second electronic device, and the future playback time;

calculate, a time for the electronic device to output the audio data based on the synchronized audio playback time and an actual time that the electronic device is able to perform playback; and cause information indicative of the time to be transmitted to the server system.

11. The electronic device of claim 10, further comprising the processing system being configured to receive, from the server system, a second synchronized audio playback command, the second synchronized audio playback command including a second set of audio data to be output and a second future playback time relative to the master clock, wherein, the second future playback time is based at least in part on the time.

12. The electronic device of claim 11, wherein the electronic device functions as part of a group of electronic devices that each output the audio in synchronization.

13. The electronic device of claim 12, wherein the second future playback time is based at least in part on a plurality of times, including the time, received from the group of electronic devices.

14. The electronic device of claim 10, wherein the time is calculated based upon a difference between the synchronized audio playback time and the actual time.

15. The electronic device of claim 10, wherein the electronic device is configured to output the audio data via the speaker system based on the determined synchronized audio playback time.

16. A system, comprising:
a plurality of electronic devices, each electronic device comprising:
an audio system,
an internal clock,
one or more processors, and memory storing instructions for execution by the one or more processors, wherein:
each of the electronic devices being configured for two-way communications with a server system and is associated with a user account maintained at the server system; and
the one or more processors are configured to:
receive, from the server system, an identification of a second electronic device, the second electronic device having an internal clock designated as a master clock;
receive, from the server system, a synchronized audio playback command, the synchronized audio playback command including audio data to be output and a future playback time relative to the master clock;
in response to receiving the audio data, determine a synchronized audio playback time based on an internal clock of the electronic device, the master clock of the second electronic device, and the future playback time;
calculate, a time for the electronic device to output the audio data based on the synchronized audio playback time and an actual time that the electronic device is able to perform playback; and
cause information indicative of the time to be transmitted to the server system.

17. The system of claim 16, wherein electronic devices of the plurality of electronic devices are configured to:
receive, from the server system, a second synchronized audio playback command, the second synchronized audio playback command including a second set of audio data to be output and a second future playback time relative to the master clock, wherein, the second future playback time is based at least in part on the time.

18. The system of claim 17, further comprising the server system.

19. The system of claim 18, wherein the server system is configured to calculate the second future playback time based at least in part on a plurality of times, including the time, received from the plurality of electronic devices.

20. The system of claim 16, wherein each electronic device of the plurality of electronic devices is configured to:
output, via one or more speakers, the audio data based on the determined synchronized audio playback time.

* * * * *